United States Patent
Sommerlade et al.

(10) Patent No.: US 11,587,528 B2
(45) Date of Patent: Feb. 21, 2023

(54) OPTIMIZED FACIAL ILLUMINATION FROM ADAPTIVE SCREEN CONTENT

(71) Applicant: Microsoft Technology Licensing, LLC, Redmond, WA (US)

(72) Inventors: Eric Chris Wolfgang Sommerlade, Oxford (GB); Steven N. Bathiche, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/174,478

(22) Filed: Feb. 12, 2021

(65) Prior Publication Data
US 2022/0262326 A1   Aug. 18, 2022

(51) Int. Cl.
| | |
|---|---|
| H04N 7/15 | (2006.01) |
| G09G 5/10 | (2006.01) |
| G09G 5/373 | (2006.01) |
| H04N 5/232 | (2006.01) |

(52) U.S. Cl.
CPC ............... *G09G 5/10* (2013.01); *G09G 5/373* (2013.01); *H04N 5/23216* (2013.01); *H04N 7/15* (2013.01); *G09G 2320/0626* (2013.01); *G09G 2320/0686* (2013.01); *G09G 2354/00* (2013.01)

(58) Field of Classification Search
CPC ............ G09G 5/10; G09G 5/373; H04N 7/15; H04N 5/232
USPC ............................................. 348/14.01–14.16
See application file for complete search history.

(56) References Cited

U.S. PATENT DOCUMENTS

| | | | |
|---|---|---|---|
| 9,635,255 B1 | 4/2017 | Baldwin | |
| 2009/0322889 A1* | 12/2009 | Kujawa | H04N 5/2354 348/207.99 |
| 2016/0225301 A1 | 8/2016 | Scepanovic et al. | |
| 2019/0188454 A1* | 6/2019 | Yuan | H04N 5/232945 |
| 2020/0092453 A1 | 3/2020 | Gordon et al. | |
| 2021/0118404 A1* | 4/2021 | Bartscherer | H04N 5/2351 |

FOREIGN PATENT DOCUMENTS

CN        107909640 A  *  4/2018  ............... G06N 3/08

OTHER PUBLICATIONS

"International Search Report and Written Opinion Issued in PCT Application No. PCT/US22/013090", dated Apr. 25, 2022, 12 Pages.

* cited by examiner

Primary Examiner — Melur Ramakrishnaiah

(57) ABSTRACT

Aspects of the present disclosure relate to adjusting an illumination of a user depicted in one or more images when using a video conferencing application. In one example, one or more images depicting the user may be received from an image sensor. Further, an illumination of the user depicted in the one or more images may be determined to be unsatisfactory. For example, the user's face may be too bright or too dim. Accordingly, content displayed at a display device may identified and then modified. The modified content may then be rendered to a display device thereby changing the illumination of the user depicted in subsequent images. In examples, the modified content may include a graphical element, such as a ring of a specific color at least partially surrounding content rendered to and displayed at the display device.

20 Claims, 16 Drawing Sheets

OPTIMIZED FACIAL ILLUMINATION FROM ADAPTIVE SCREEN CONTENT

BACKGROUND

Good lighting is difficult to obtain when performing a video conference call or otherwise utilizing a video conferencing application. In instances where ambient light in a room or environment is not sufficient to properly illuminate a user, an image or video of the user may be unsatisfactory. For example, a user may appear underexposed, dim, over exposed, too bright, may appear with a color tone or hue induced from light reflecting from a display at which the user is looking, or otherwise difficult to view. Further, video compression algorithms or modules may exacerbate an unsatisfactory image as brightness, contrast, and luminance parameters may overcompensate and/or undercompensate image corrections.

It is with respect to these and other general considerations that embodiments have been described. Also, although relatively specific problems have been discussed, it should be understood that the embodiments should not be limited to solving the specific problems identified in the background.

SUMMARY

In accordance with examples of the present disclosure, content rendered to a display device may be adapted to provide a better lighting experience for a user. For example, a graphical element, such as a ring of light, may be generated and displayed around an object, image, or other content displayed at the display device to direct light to a user's face. Accordingly, a consistent lighting source from the display device may illuminate the user such that the user's appearance is more natural and/or is a beautified representation of the user. In addition, the graphical element may track the user amongst various lighting environments such that not only is the light illuminating the user consistent, but the light color despite being in various light environments is consistent as well.

In accordance with at least one example of the present disclosure, a method for adjusting an illumination of a user depicted in one or more images is described. The method may be performed at a computing device in communication with a network. The method includes: receiving one or more images from an image sensor; extracting a plurality of image features from the received one or more images; determining that an illumination of a user depicted in the one or more images is unsatisfactory based on the extracted features and the received one or more images; identifying content displayed at a display device; and adapting the identified content displayed at the display device based on the extracted features and the received one or more images, the adapted content changing an illumination of the user.

In accordance with at least one example of the present disclosure, a system for adjusting an illumination of a user depicted in one or more images is described. The system includes a processor; an image sensor; and memory including instructions, which when executed by the processor, cause the processor to: receive, at a video conferencing application, one or more images from an image sensor; extract a plurality of image features from the received one or more images; determine that an illumination of a user depicted in the one or more images is unsatisfactory based on the extracted features and the received one or more images; receive an image of content displayed at a display device; and generate display device lighting parameters based on the extracted features, the received one or more images, and the image of content displayed at the display device, wherein the display device lighting parameters cause a change in the illumination of the user depicted in images subsequently received from the image sensor.

In accordance with at least one example of the present disclosure, a computer storage medium including instructions is described. The instructions of the computer storage medium, when executed by a processor, cause the processor to: receive one or more images from an image sensor; determine that an illumination of a user depicted in the one or more images is unsatisfactory; identify content displayed at a display device; modify the identified content displayed at the display device based on the determination that the illumination of the user depicted in the one or more images is unsatisfactory; and cause the modified content to be rendered to the display device.

This Summary is provided to introduce a selection of concepts in a simplified form, which is further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTION OF THE DRAWINGS

Non-limiting and non-exhaustive examples are described with reference to the following Figures.

DETAILED DESCRIPTION

In the following detailed description, references are made to the accompanying drawings that form a part hereof, and in which are shown by way of illustrations, specific embodiments or examples. These aspects may be combined, other aspects may be utilized, and structural changes may be made without departing from the present disclosure. Embodiments may be practiced as methods, systems, or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Good lighting is difficult to obtain when performing a video conference call or otherwise utilizing a video conferencing application. In instances where ambient light in a room or environment is not sufficient to properly illuminate a user, an image or video of the user may be unsatisfactory. For example, a user may appear underexposed, dim, over exposed, too bright, may appear with a color tone or hue induced from light reflecting from a display at which the user is looking, or otherwise difficult to view. Further, video compression algorithms or modules may exacerbate an unsatisfactory image as brightness, contrast, and luminance parameters may overcompensate and/or undercompensate image corrections. In accordance with examples of the present disclosure, content at a display device at which a user views may be adapted to better light a user. For example, a ring of light around an object, image, or other content displayed at a display device may help to direct light to a user's face thereby illuminating the user such that user appears in a more natural form.

Figure 1A:
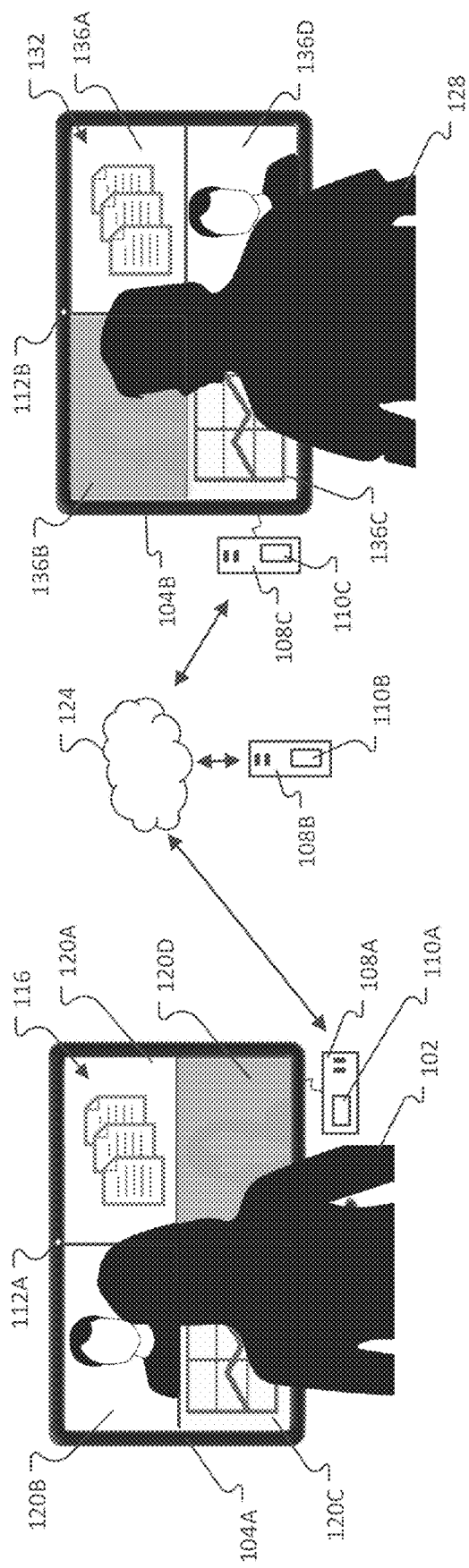
FIGS. 1A-1B depict details of a video conferencing system in accordance with examples of the present disclosure.
Figure 1B:
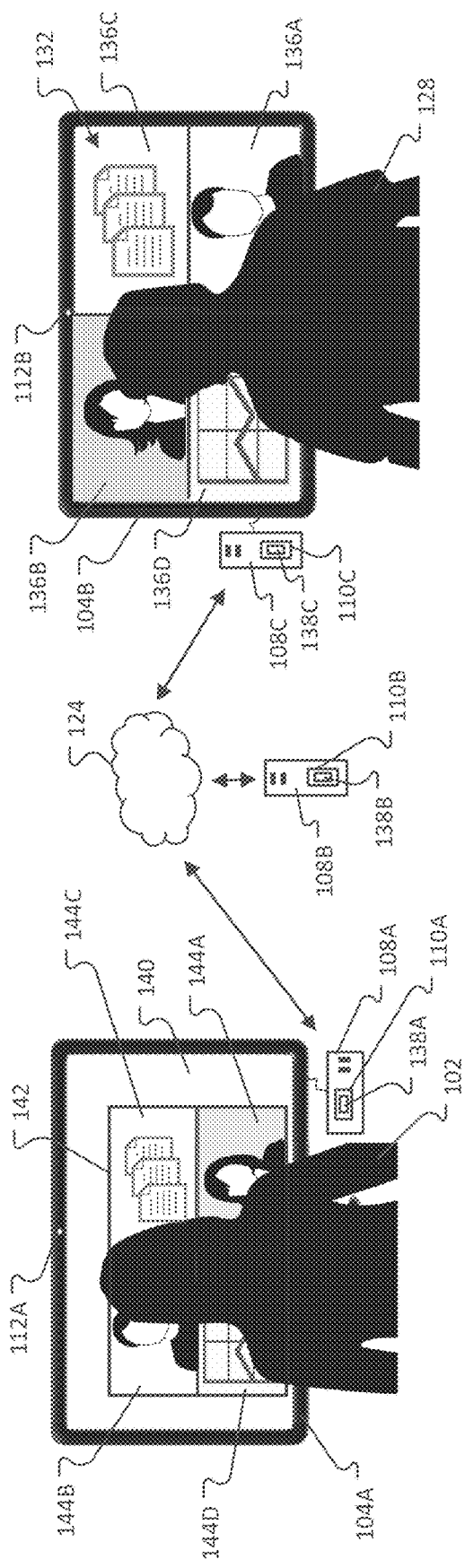

FIGS. 1A-1B depict details of a video conferencing system in accordance with examples of the present disclosure. As depicted in FIG. 1A, a user 102 may be located in front of a display device 104A coupled to a computing system 108A. The computing system 108A may execute a video conferencing application 110A which may cause the image sensor 112A to acquire one or more images of the user 102. The one or more images of the user 102 may be transmitted or otherwise provided to a computing system 108C of a user 128 as a video conferencing system participant remotely located from the user 102 utilizing the network 124; the one or more images of the user 102 may then be displayed at a display device 104B that is coupled to the computing system 108C. Similarly, the computing system 108C may execute a video conferencing application 110C which may cause the image sensor 112B to acquire one or more images of the user 128. The one or more images of the user 128 may be transmitted or otherwise provided to a computing system 108A of the user 102 as a video conferencing system participant remotely located from the user 128 utilizing the network 124; the one or more images of the user 128 may then be displayed at the display device 104A that is coupled to the computing system 108A.

In examples, the video conferencing application 110A may generate a user interface 116; the user interface 116 may include one or more portions, or windows 120A-120D. As a non-limiting example, the windows 120A-120D may include a content window 120A, a participant window 120B, a content window 120C, and a local video window 120D. The content windows 120A and 120C may refer to windows that include content that is shared or shown during a video conference or video call and may be shared or provided by the user 102 or another conference participant, such as the user 128 as a video conferencing system participant. In examples, one or more images comprising a live-stream video of the user 128 as a video conferencing system participant may be provided in the window 120B. The user interface 116 may also include a local video window 120D displaying the one or more images or live-stream video of the user 102. Similarly, the video conferencing application 110C may generate a user interface 132; the user interface 132 may include one or more portions, or windows 136A-136D. As a non-limiting example, the windows 136A-136D may include a content window 136D, a participant window 136B, a content window 136D, and a local video window 136A. The content windows 136D and 136C may refer to windows that include content that is shared or shown during a video conference or video call and may be shared or provided by the user 128 or another conference participant, such as the user 102 as a video conferencing system participant. In examples, one or more images comprising a live-stream video of the user 102 as a video conferencing system participant may be provided in the window 136B. The user interface 116 may also include a local video window 136A displaying the one or more images or live-stream video of the user 128. Of course, other participants may be included, other content may be shared, and there may be more or fewer windows than windows 120A-120D and 136A-136D illustrated in FIG. 1A.

In examples, a video conferencing application 110B may be located at a computing system 108B and may provide off-premises services including but not limited to providing video conferencing services. Accordingly, one or more participant video streams may be provided to the video conferencing application 110B such that the video conferencing application 110B may distribute the received video streams to video conference participants.

As previously discussed, the user 102 may be utilizing a video conferencing application 110A that is at least partially executed at the computing system 108A coupled to the display device 104A. The image sensor 112A may acquire an image of the user 102 and transmit the image as part of a video stream to a conversation participant remotely located from the user 102. In some instances, an amount of light, such as ambient light in a room or environment in which the user 102 is located, may not sufficiently illuminate the user 102; accordingly, the image, or video, of the user 102 received at a video conferencing application of conversation participant may be unsatisfactory.

For example, the video conferencing application 110C may receive video of the user 102 and cause the video to be displayed in the window 136B. As the one or more images of the user 102 acquired by the image sensor 112A may be of the user 102 in an environment having poor light, the images of the user 102 displayed in the window 136 may be unsatisfactory. In addition, a local video window 120D may display an image or video of the user 102 as seen by video conference participants. In examples, where ambient light does not sufficiently illuminate the user 102, the image or video of the user may appear underexposed or otherwise appear unsatisfactory as depicted in the local video window 120D. As another example, the user 102 may appear with an unnatural hue or glow, as light provided by the one or more windows 120A-D may reflect off of the user 102 and may be acquired by the image sensor 112A. Accordingly, in low-light environments, the image of the user 102, as depicted by the local video window 120D and window 136B for example, may appear dim, underexposed, or otherwise unsatisfactory. Further, video compression algorithms or modules may exacerbate an unsatisfactory image as brightness, contrast, and luminance parameters may overcompensate and/or undercompensate image corrections.

In accordance with examples of the present disclosure, an adaptive content display system 138A may adapt the content rendered to and displayed at a display device, such as the display device 104A, in such a manner as to increase an amount of light directed to the user situated in front of a corresponding image sensor, such as the image sensor 112A. As one example, a display device 104A depicted in FIG. 1B may display the user interface 142 having windows 144A-144D that are the same as or similar to windows 120A-D discussed above. However, windows 144A-144D may be reduced in size such that a graphical element 140, such as a ring of light, may be presented as part of the rendered and displayed content. The graphical element 140 may be positioned, sized, and/or otherwise configured to illuminate the user 102, or a portion of the user 102, with the light originating from the display device 104A. Accordingly, the light may be directed to toward the user 102, or a portion of the user 102, such that the user's face for example, is better illuminated. Thus, in low-light environments, the image of the user 102, as depicted by the local video window 144A and/or window 136B displayed at a display device 104B of a video conference participant for example, may appear brighter or may appear satisfactory.

In examples, the size, shape, position, and color parameters of the graphical element 140 may vary based on the image and/or video acquired by the image sensor, such as the image sensor 108. For example, where a video, or image, of the user appears to be dim or underexposed as captured by the image sensor 108, an adaptive display content system may adjust the graphical element to increase an amount of light 212 provided to the user 102 or a portion of the user 102. As another example, where a video, or image, of the user appears to be excessively bright or overexposed as captured by the image sensor 108, an adaptive display content system may adjust the graphical element to decrease an amount of light 114 that is provided to the user 102 or a portion of the user 102. In examples, the adaptive content display system 138A/138C may be included in the video conferencing application 110A/110C at a local computing devices 108A/108C; in some examples, at least some instructions of a adaptive content display system 138 may be executed at a computing system 108B providing video conferencing service in a cloud-oriented or otherwise off-premises configuration.

Figure 2A:
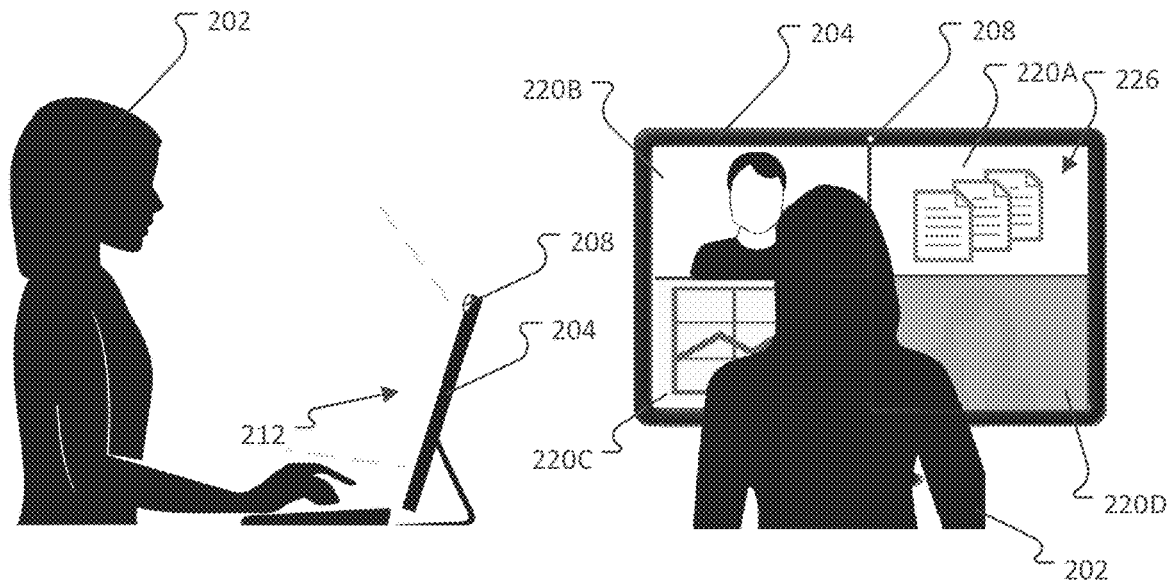
FIG. 2A-2B provide additional details of an adaptive content display system in accordance with examples of the present disclosure.
Figure 2B:
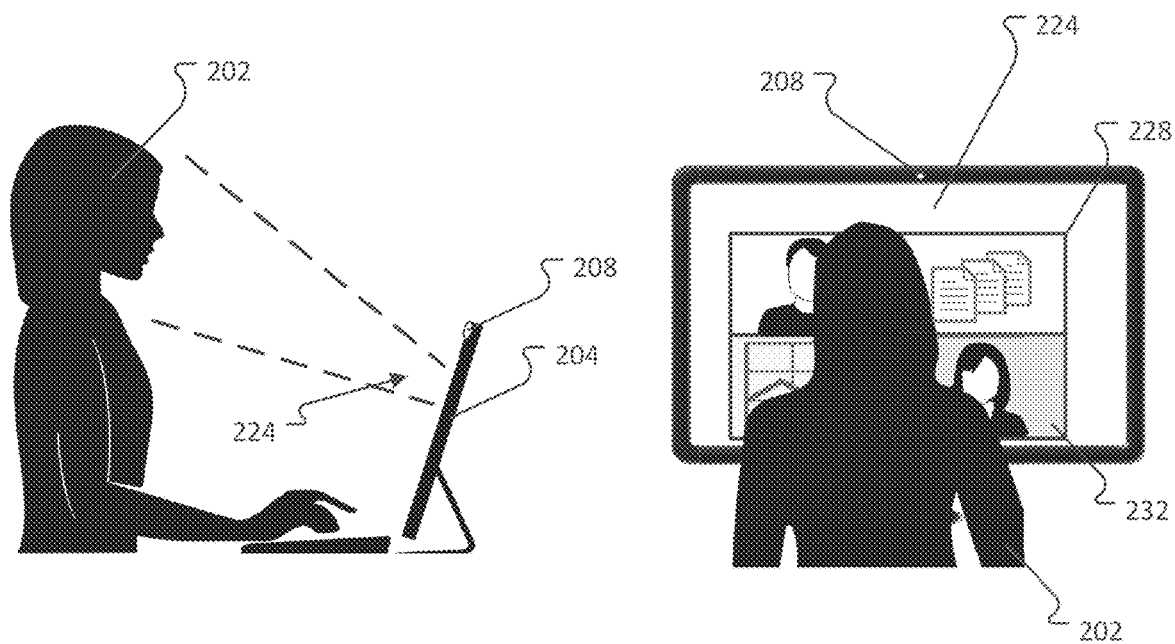

FIG. 2A-2B provide additional details of an adaptive content display system in accordance with examples of the present disclosure. The adaptive content display system may be utilized to enhance an image and/or video depicting a user that is provided to a participant during a video conference, video recording or the like. As depicted in FIG. 2A, a user 202 may be situated in front of a computing system having a display device 204 and an image sensor 208. The display device 204 may be the same as or similar to the display device 104 and the image sensor 208 may be the same as or similar to the image sensor 112. The image sensor 208 may capture an image of the user 202 and transmit or otherwise provide the image of the user to a conversation participant remotely located from the user 202. In examples, light 212 emitted from the display device 204 may illuminate the user 202; that is, the user 202 may be illuminated from the light 212 originating from the graphical user elements rendered to and displayed at the display device 204. As an example, portions or windows 220 may be rendered to the display device 204 as part of a video conferencing application or other messaging application; as a non-limiting example, the windows 220 may include a content window 220A, a participant window 220B, a content window 220C, and a local video window 220D. The content windows 220A and 220C may refer to windows that include content that is shared or shown during a video conference or video call and may be shared or provided by the user 202 or another conference participant, such as the participant displayed in the participant window 220B. Of course, other participants may be included, other content may be shared, and there may be more or fewer windows than windows 220A-220B illustrated in FIG. 2A.

In instances where the user 202 may be utilizing a video conferencing application or messaging application at least partially executed at the computing system having the display device 204, the image sensor 208 may acquire an image of the user 202 and transmit the image as part of a video stream to a conversation participant remotely located from the user 202. In some instances, an amount of ambient light in a room or environment in which the user 202 is located may not sufficiently illuminate the user 202; accordingly, the image, or video, of the user 202 received at a computing system of conversation participant may be unsatisfactory. The local video window 220D may display an image or video of the user 202 as seen by video conference participants. In examples, where ambient light does not sufficiently illuminate the user 202, an image or video of the user may appear underexposed or otherwise appear unsatisfactory as depicted in the local video window 220D. As another example, the user 202 may appear with an unnatural hue or glow, as light 212 provided by the one or more windows 220A-D may reflect off of the user 202 and may be acquired by the image sensor 208. Further, the light 212 provided by the one or more windows 220A-D may be non-directional or otherwise uncontrolled. For example, while a user 202 may brighten and dim a display device 204, such light 212 is not focused, concentrated, or otherwise purposefully directed toward the user 202. Accordingly, in low-light environments, the image of the user 202, as depicted by the local video window 220D for example, may appear dim, underexposed, or otherwise unsatisfactory.

In accordance with examples of the present disclosure, the content rendered to and displayed a the display device 204 may be adapted in such a manner as to increase an amount of light directed to the user 202. As one example, a display device 204 may include the same or similar windows 220A-D discussed above, however such windows may be reduced in size such that a graphical element 224, such as a ring of light, may be presented as part of the rendered and displayed content. The graphical element 224 may be positioned, sized, and/or otherwise configured to illuminate the user 202, or a portion of the user 202, with the light 214 originating from the display device 204. Accordingly, the light 214 may be directed to toward the user 202, or a portion of the user 202, such that the user's face for example, is better illuminated. Thus, in low-light environments, the image of the user 202, as depicted by the local video window 232 for example, may appear brighter or may appear satisfactory when provided to a video conference participant.

In examples, the size, shape, position, and color parameters of the graphical element 224 may vary based on the image and/or video acquired by the image sensor 208. For example, where a video, or image, of the user appears to be dim or underexposed as captured by the image sensor 208, an adaptive display content system may adjust the graphical element to increase an amount of light 212 provided to the user 202 or a portion of the user 202. As another example, where a video, or image, of the user appears to be excessively bright or overexposed as captured by the image sensor 208, an adaptive display content system may adjust the graphical element to decrease an amount of light 214 that is provided to the user 202 or a portion of the user 202.

Figure 3A:
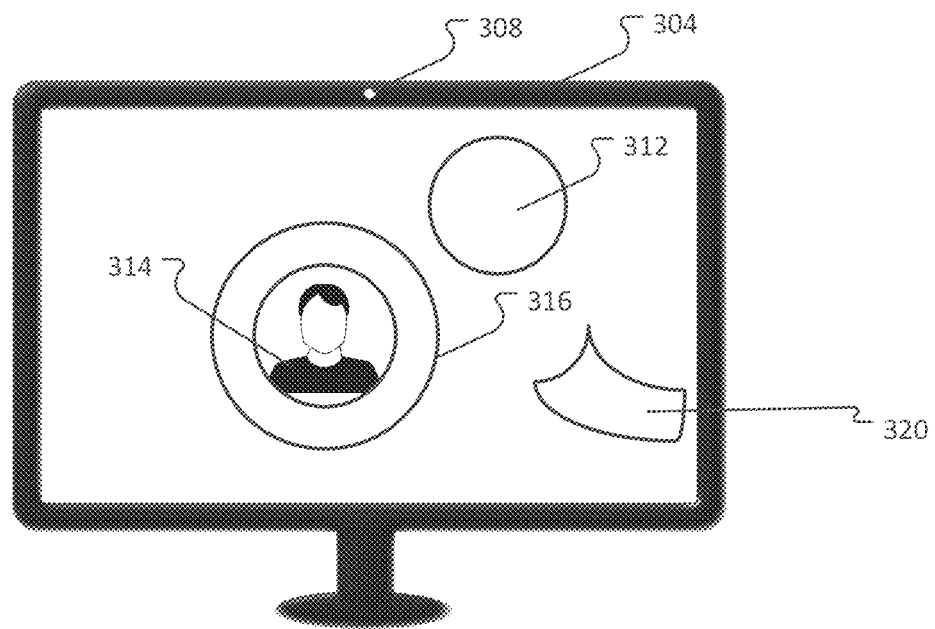
FIGS. 3A-3B depict example user interfaces in accordance with examples of the present disclosure.
Figure 3B:
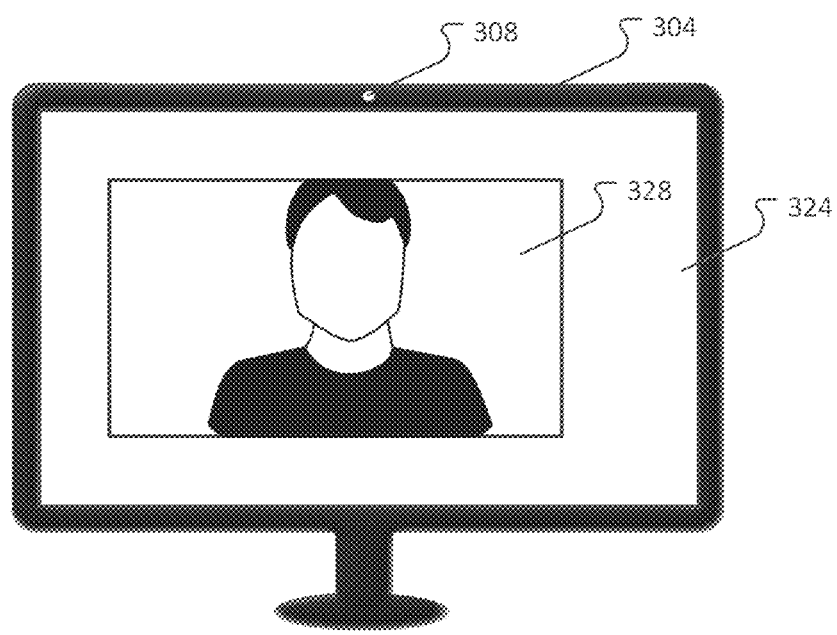

FIGS. 3A-3B depict example ring-lights in accordance with examples of the present disclosure. More specifically, content may be rendered to a display device 304, which may be same as or similar to the display device 104. In examples, the content may include a single window displaying, for example, an avatar 314 of a conversation participant, for example the user 128 as a video conferencing participant. In examples, the image sensor 208, which may be the same as or similar to the image sensor 108, may acquire an image of a user positioned in front of the display device 204 or otherwise within a field-of-view of the image sensor 208; the image may be processed using an adaptive display content system, such as the adaptive content display system 138 previously discussed. The adaptive display content system may cause the graphical element 316 to be included in the content rendered to and displayed at the display device 304. In some examples, the graphical element 316 may overlay existing content displayed at the display device 304. Accordingly, an amount of light illuminating the user positioned in front of or otherwise located within the field-of-view of the image sensor 308 may be increased. As further depicted in FIG. 3A, the size and/or shape of the graphical element 316 may change. For example, in lower lighting conditions, the size of the graphical element 316 may be increased. In lighting conditions where an ambient light may be of a certain color, hue, or wavelength for example, the graphical element 316 may be of a different color, hue, or wavelength to offset the effects of the ambient light. Alternatively, or in addition, the adaptive display content system may cause a graphical element 316, circle 312, and/or graphical element of another shape 320, to be included in the content rendered to and displayed at the display device 304. Accordingly, an amount of light illuminating the user positioned in front of or otherwise located within the field-of-view of the image sensor 308 may be increased and/or matched to a position of the user and/or a desired lighting condition, where the desired lighting condition may be user selectable and/or may be configured to optimize an image quality obtained by the image sensor 308.

As depicted in FIG. 3B, a size of a participant window 328 displaying an image of a participant that is located remotely from the display device 304 may be adjusted. In some examples, the graphical element may include a graphical element 324, such as a ring of light, at least partially surrounding the participant window 328. In some examples, the graphical element 324 may not be symmetrical; for example a size or area of the graphical element at the right-side and/or bottom of the display device 304 may be larger or smaller than a size or area of the graphical element at the left-side and/or bottom of the display device 304. Thus, for example, in instances where a portion of a user, such as the right-side of a user's face is shadowed or otherwise appears to be not as bright as another portion of the user, such as the left-side of the user, the graphical element 324 may cause more light to be projected from the display device 304 and directed to the right-side of the user's face.

Figure 4A:
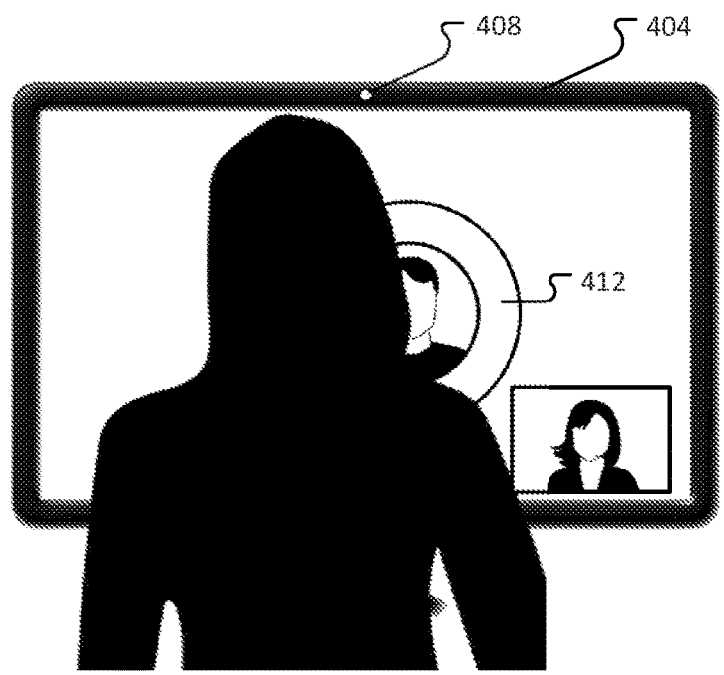
FIGS. 4A-4B depict additional example user interfaces in accordance with examples of the present disclosure.
Figure 4B:
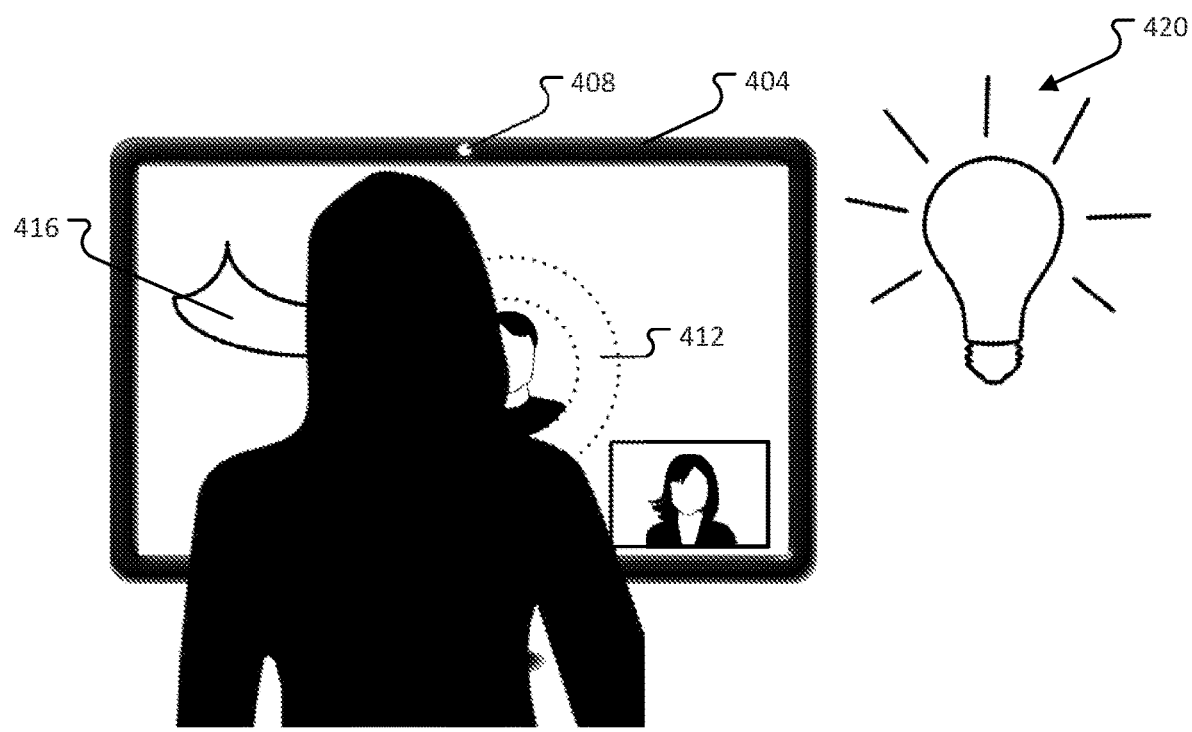

FIGS. 4A-4B are directed to adapting content displayed to a display device in accordance with examples of the present disclosure. More specifically, content may be rendered to a display device 404, which may be same as or similar to the display device 104. In examples, the image sensor 408, which may the same as or similar to the image sensor 112, may acquire an image of a user positioned in front of the display device 304 or otherwise within a field-of-view of the image sensor 408; the image may be processed using an adaptive display content system. The adaptive display content system, which may be the same as or similar to the adaptive content display system 138, may cause a graphical element 412 to be rendered to and displayed at the display device 404, where the graphical element 412 is at least partially around an avatar of a video conferencing system participant. In examples, the amount of light provided by the graphical element 412 may change over the course of a video conference. For example, a graphical element 412 may no longer be needed and/or displayed as depicted in FIG. 4B; that is, ambient light from a light source 420 may cause the graphical element 412 to no longer be needed. As another example, the light source 420 may suddenly appear, causing an excessive amount of light to be directed to a right side of a user. Accordingly, the adaptive display content system may cause a graphical element 416 to be rendered to the display device 404 at the left side of the display device 404. The graphical element 416 and/or the graphical element 412 may obscure or otherwise occlude a portion of the content displayed to the display device 404. In examples, the graphical element 416 and/or the graphical element 412 may be rendered and displayed separate from the content displayed at the display device 404; alternative, or in addition, the graphical element 416 and/or the graphical element 412 may be rendered and displayed together with the content displayed at the display device 404.

Figure 5A:
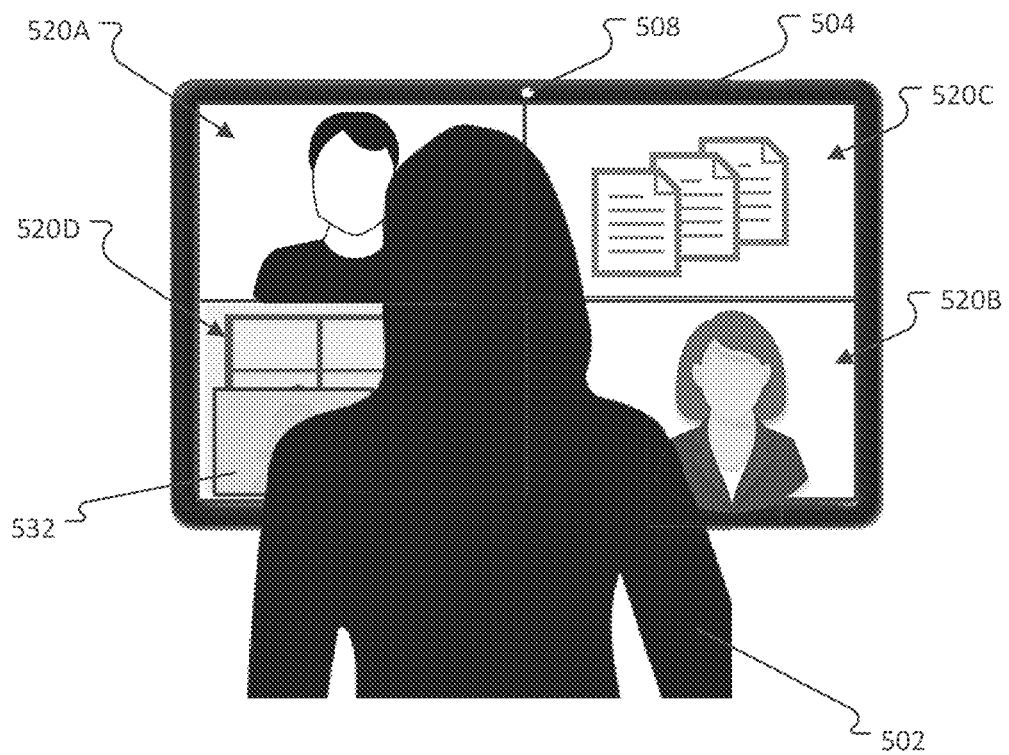
FIGS. 5A-5B depict additional example user interface configurations in accordance with examples of the present disclosure.
Figure 5B:
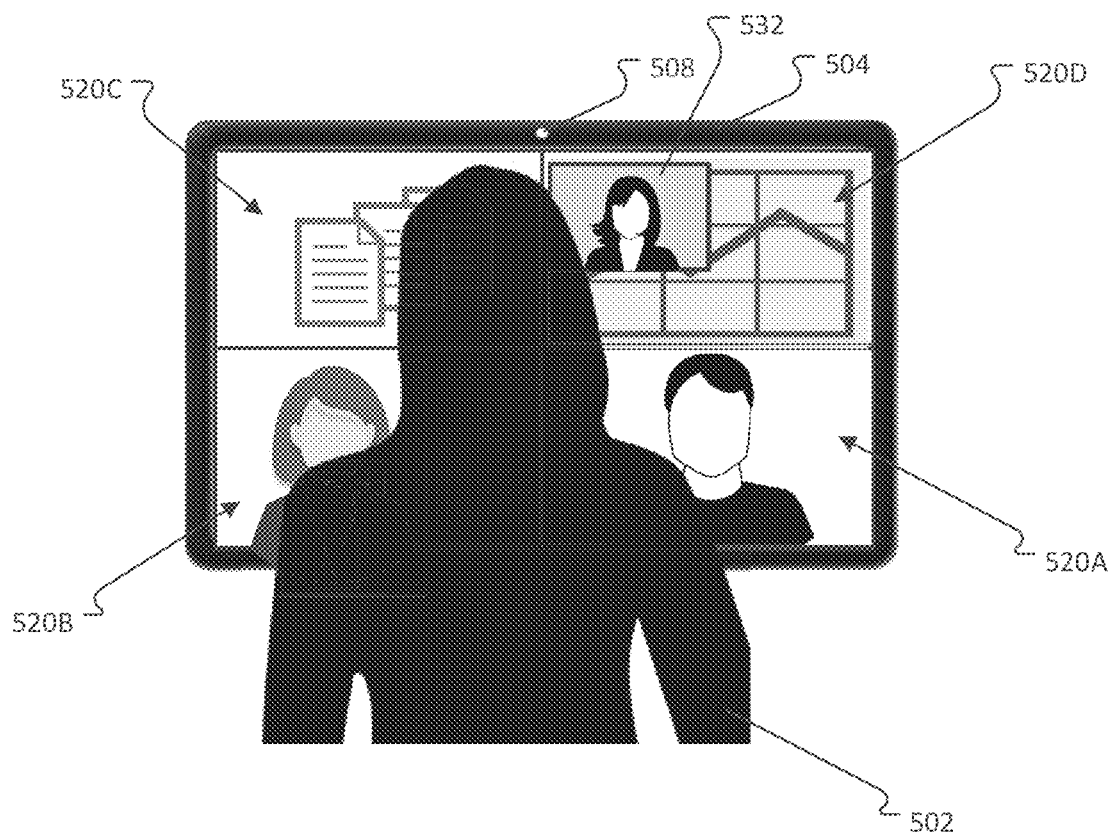

FIGS. 5A-5B depict an additional example directed to adapting content displayed at a display device in accordance with examples of the present disclosure. More specifically, the display device 504, which may be the same as or similar to the display device 104, may display content that includes participant windows 520A and 520B and content windows 520C and 520D. In examples, one or more images acquired by the image sensor 508 may be provided to an adaptive content display system which may be the same as or similar to the adaptive content display system 138 previously described. The adaptive content display system may cause the participant windows 520A and 520B and the content windows 520C and 520D to be shifted and/or moved to increase an amount of light originating from the display device 504 and directed to a user 502. For example, the adaptive content display system may cause the participant window 520 to move from being displayed in the upper left of the display device 504 to being displayed in the lower right portion of the display device 504. As another example, the content window 520C displaying one or more documents may move from the upper right portion of display device 504 to an upper left portion of the display device 504. Similarly, a local video display window 532 may move to a different location as depicted in FIG. 5B. Accordingly, by adapting the location of content that is displayed, an amount of light illuminating the user 502 may be modified such that the image sensor 508 may acquire a more suitable and satisfactory image to be provided to video conference participants.

Figure 6A:
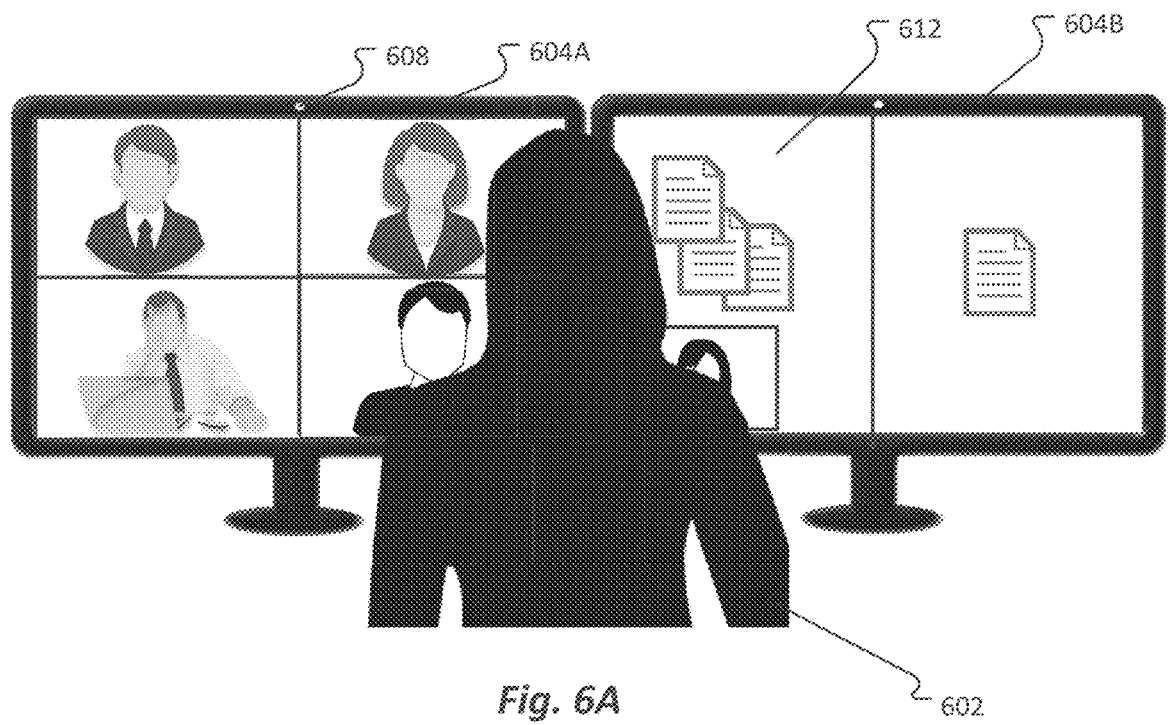
FIGS. 6A-6B depict additional example user interface configurations in accordance with examples of the present disclosure.
Figure 6B:
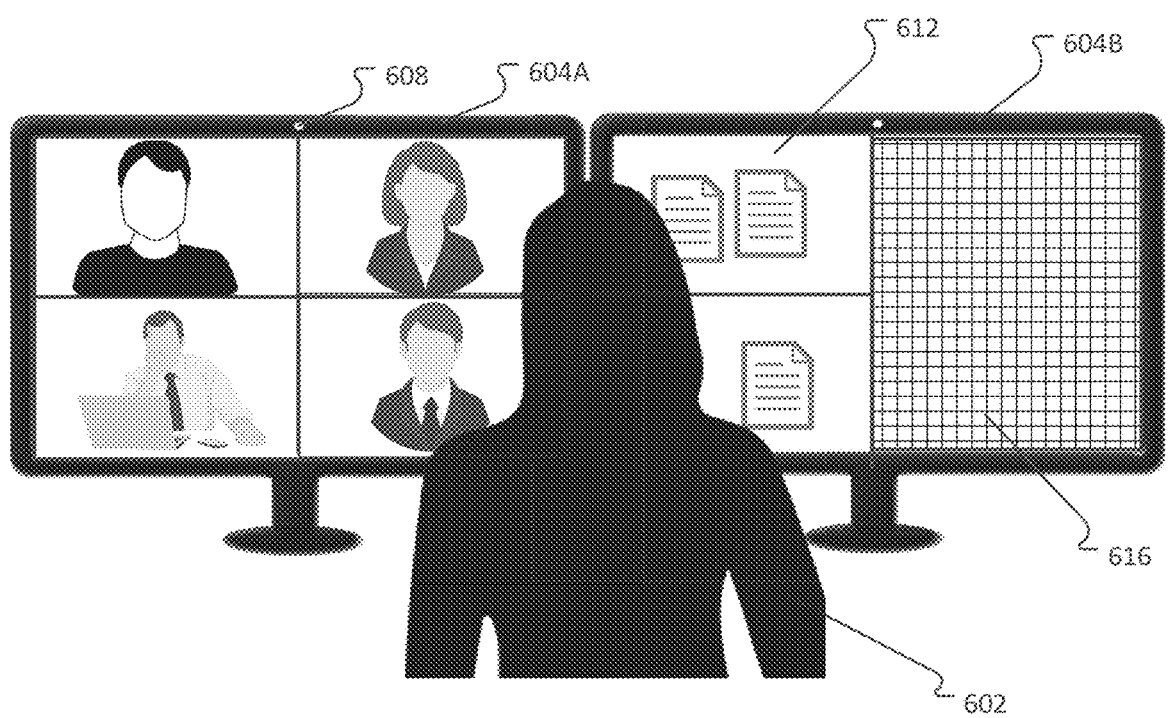

FIGS. 6A-6B depict an additional example directed to adapting content displayed at a display device in accordance with examples of the present disclosure. The adaptive content display system, which may be the same as or similar to the adaptive content display system 138 previously described, may modify content rendered to and displayed at multiple display devices. More specifically, the display devices 604A and 604B, which may be the same as or similar to the display device 104, may display content that includes participant windows and content windows. In examples, one or more images acquired by the image sensor 608 may be provided to the adaptive content display system; the adaptive content display system may cause the participant windows and the content windows to be shifted and/or moved to increase an amount of light provided to a user 602. For example, the adaptive content display system may cause a participant window to move from being displayed in the upper left of the display device to being displayed in the lower right portion of the display device. As another example, the content window displaying one or more documents may move from the left portion of a display to an upper left portion of the display. Further, in some examples, a portion of the display may display a graphical element, such as the graphical element 616. Accordingly, by adapting the location of content that is displayed, an amount of light illuminating the user 602 may be modified such that the image sensor 608 may acquire a more suitable and satisfactory image to be provided to video conference participants.

Figure 7A:
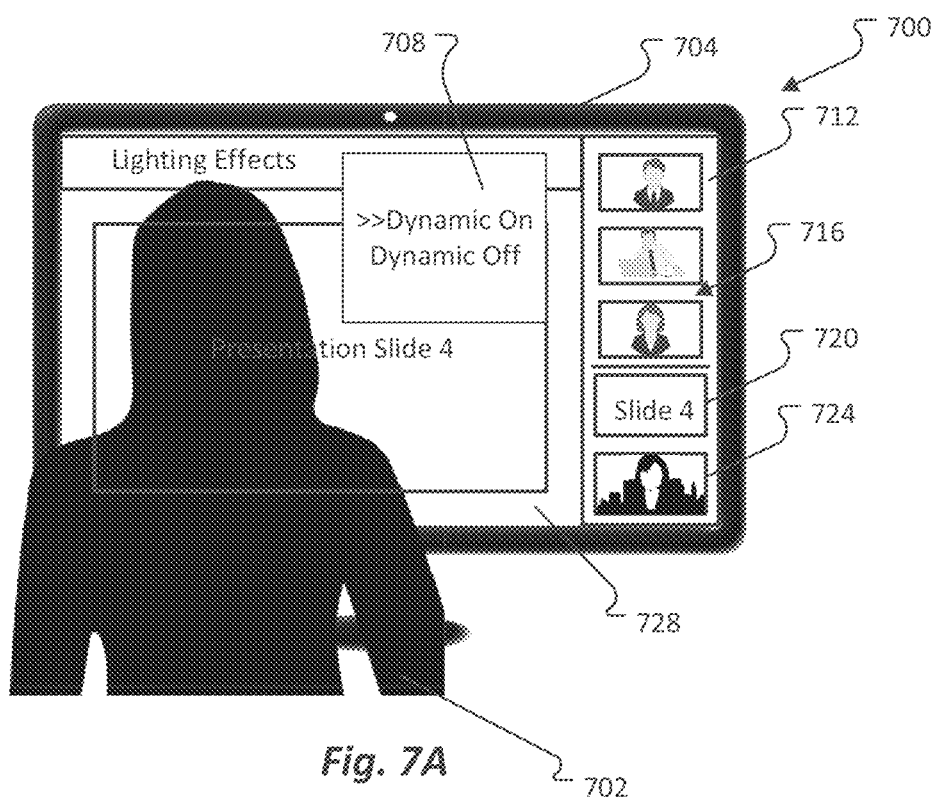
FIGS. 7A-7B depict an example user interface configuration for selectively enabling an adaptive content display system in accordance with examples of the present disclosure.
Figure 7B:
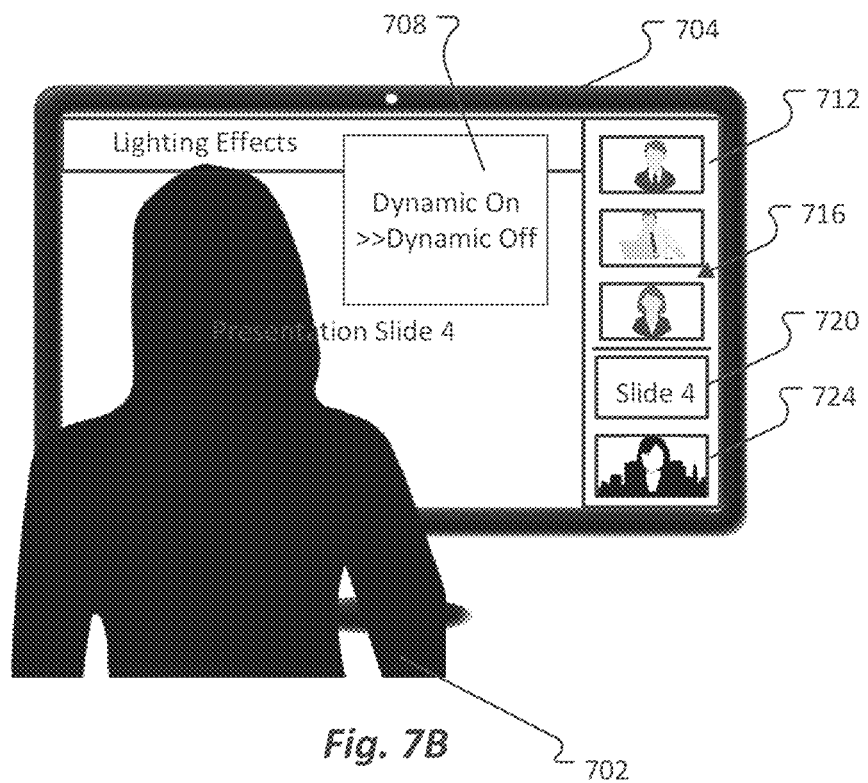

FIG. 7A depicts an example user interface in accordance with examples of the present disclosure. The user interface 700 may be a user interface of a video conference or video meeting application, such as the video conferencing application 110 previously described. The user interface may include a panel 712 displaying one or more participants 716, a presentation panel 720 displaying a presentation, and a local video or image panel 724 displaying an image of the user 702 that may be provided to the one or more remotely located participants. The user interface 704 may include a menu 708 that allows a user 702 for example, to turn on and/or turn off the adaptive content display system. As depicted in FIG. 7A, the adaptive content display system is toggled or otherwise turned "on" as indicated by the menu selection in the menu 708 and the graphic element 728. As further depicted in FIG. 7B, the adaptive content display system is toggled off or otherwise turned "off" as indicated by the menu selection in the menu 708 and the lack of a graphic element 728.

Figure 8A:
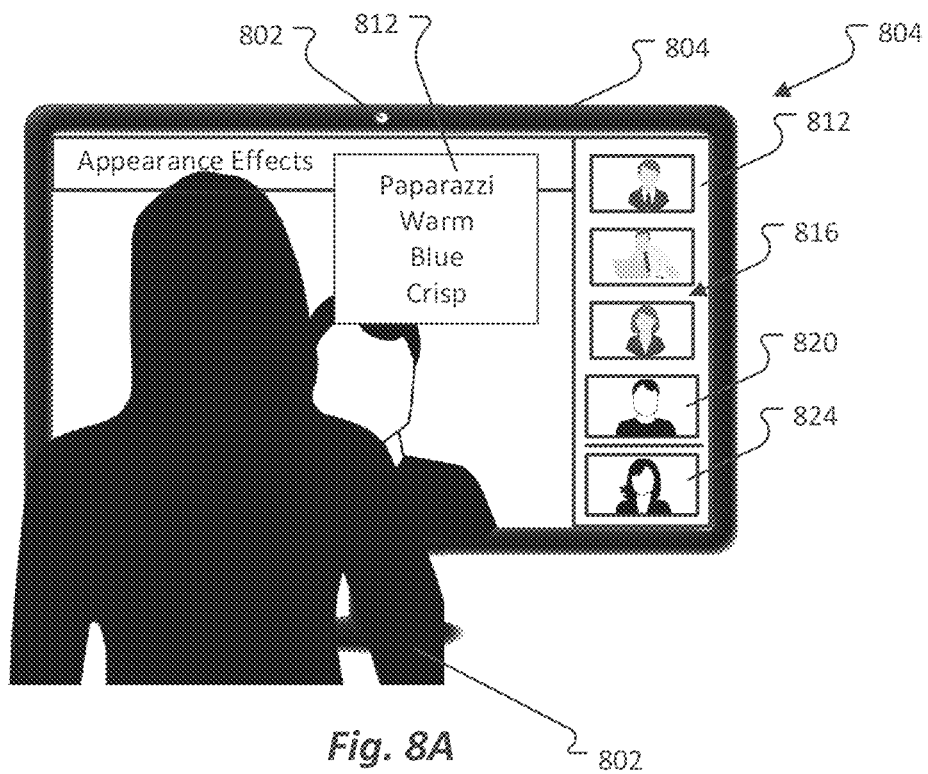
FIGS. 8A-8B depict an example user interface configuration for selectively enabling an image enhancement mode operation in accordance with examples of the present disclosure.
Figure 8B:
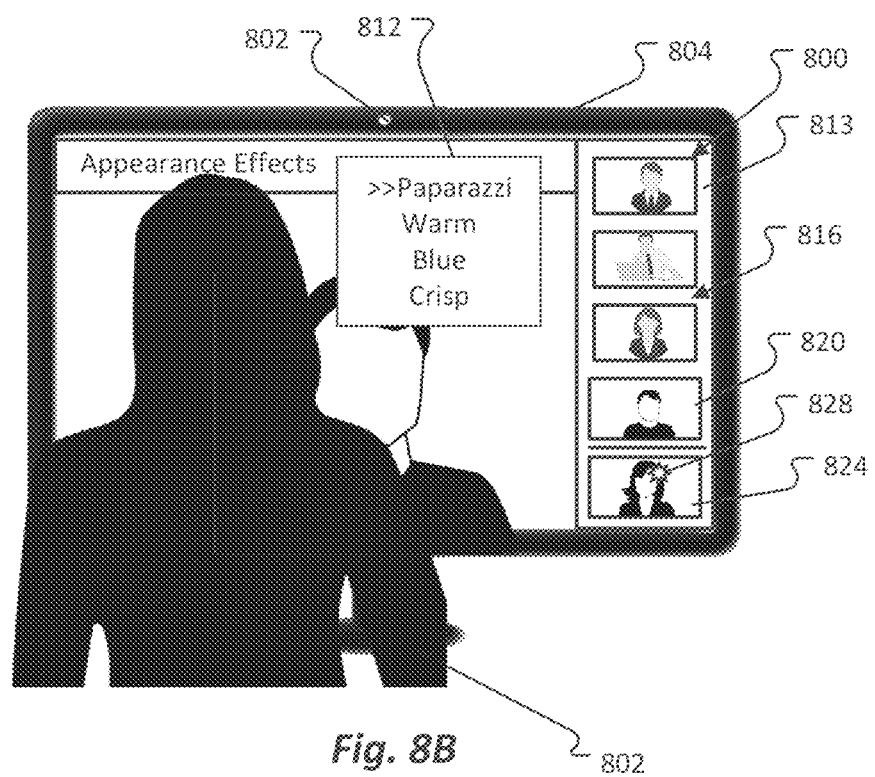

As depicted in FIGS. 8A-8B, the adaptive content display system may further provide one or more image/video or user enhancement options in accordance with examples of the present disclosure. For example, an example user interface 800 in accordance with examples of the present disclosure is depicted in FIG. 8A. The user interface 800 may be a user interface of a video conference or video meeting application, such as the video conferencing application 110 previously described. The user interface may include a panel 813 displaying one or more participants 816, and a local video window 824 or image panel displaying an image of the user 802 that may be provided to the one or more remotely located participants. The user interface 800 may include a menu 812 that allows a user 802 for example, to select an image/video enhancement mode. For example, as depicted in FIG. 8B, a paparazzi image/video enhancement mode may be enabled such that paparazzi-like image enhancements may be applied to the one or more images of the user 802 as acquired by the image sensor 803 for example. As depicted in the local video window 824 of FIG. 8B, a mode icon 828 may indicate that such enhancement mode has been enabled.

The enhancement modes of FIG. 8A and FIG. 8B may be applied to the one or more images acquired by the image sensor 803; in some examples, the one or more images may be processed locally at a computing device associated with the display device 804; in some examples, the one or more images may be processed in the cloud environment and/or at an off-premises configuration. The enhancement mode options may include, but are not limited to a paparazzi enhancement mode, a warm enhancement mode, a blue enhancement mode, and/or a crisp enhancement mode.

Figure 9:
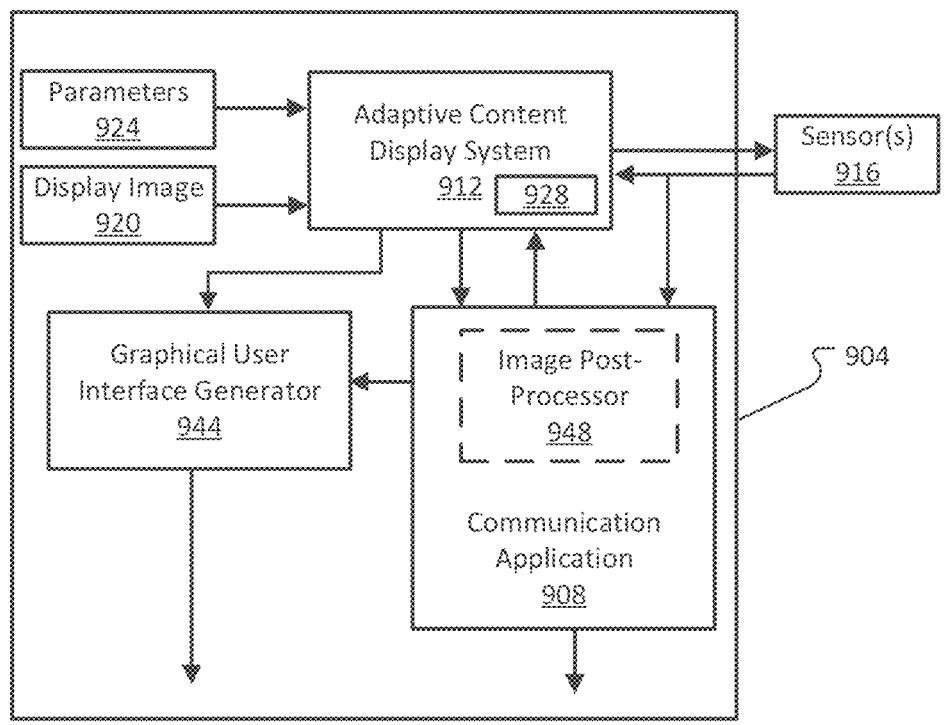
FIG. 9 depicts additional details of a computing system associated with adapting content at a display device in accordance with examples of the present disclosure.
Figure 9:
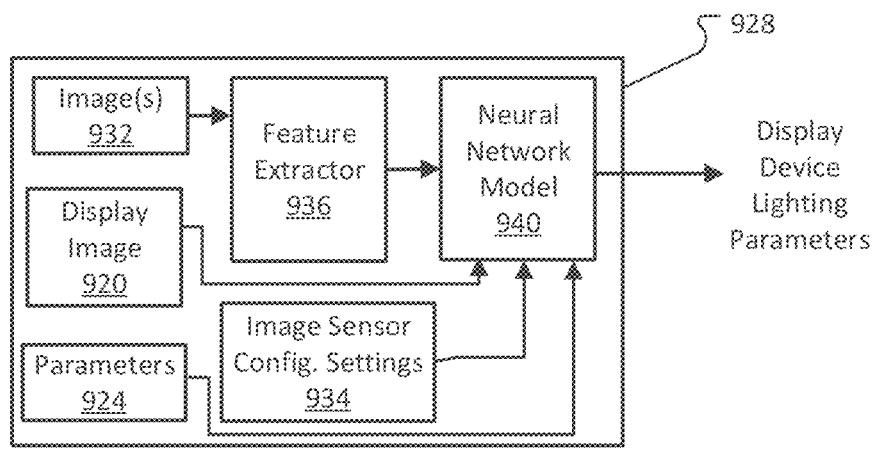
Figure 9:
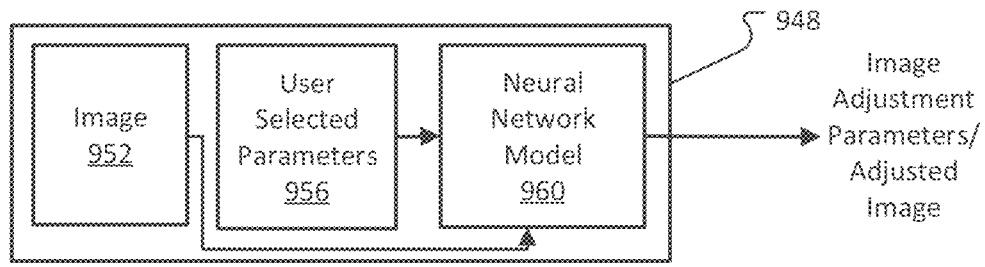

FIG. 9 depicts details of a computing system 904 in accordance with examples of the present disclosure. The computing system 904 may be the same as or similar to the computing system 108 as previously described. In examples, the computing system may include a communication application 908 and an adaptive content display system 912; the communication application 908 may be the same as or similar to the communication application 110 as previously described and the adaptive content display system 912 may be the same as or similar to the adaptive content display system 138 as previously described. The communication application 908 may be a video conferencing application and may receive one or more images from one or more image sensors 916. The one or more image sensors 916 may be the same as or similar to the image sensor 112 and/or may include an ambient light level sensor. An image sensor may be any image sensor capable of acquiring one or more images, where the one or more images may be an image derived from light of the infrared spectrum, the visible light spectrum, and/or or another light spectrum. In examples, the one or more images received from the one or more image sensors 916 may be provided as an output of the communication application 908; that is, the one or more images may be provided to a communication application that is different from or otherwise located remotely from the communication application.

In accordance with examples of the present disclosure, the one or more images from the one or more image sensors 916 may be provided to the adaptive content display system 912. In addition to receiving the one or more images, the adaptive content display system 912 may also receive a display image 920, which may refer to a screenshot or an image depicting content currently displayed to a display device. In some examples, parameters 924 may also be received at the adaptive content display system 912. The parameters 924 may include environmental configuration settings and/or parameters including, but not limited to a display reflectivity parameter, a device hinge angle (e.g., for laptops or other devices with connected screens or display devices), a typical distance between the user and the display device, an approximate location of the one or more image sensors 916 with respect to the user and/or a display device, etc. In some examples, the adaptive content display system 912 may also receive one or more configuration settings from the one or more image sensors 916. The one or more configuration settings may include, but are not limited to an image sensors ability to capture light (e.g., ISO setting), an image resolution, an image sensor color balance, and color balance, etc.

The parameters 924, display image 920, image sensor configuration settings, and the one or more images may be provided to a network model 928. The network model 928 may receive the one or more images 932 from the one or more image sensors 916 and extract features from the one or more images 932 at a feature extractor 936. The features may include distance measurement information, such as a distance a user is from a display device, locations within the one or more images of the user's face, etc. The features extracted from the feature extractor 936, the display image 920, the parameters 924, and/or the image sensor configuration settings 934 may be provided to a neural network model 940. In examples, the neural network model 940 may include but is not limited to a transformer model, a convolutional neural network model, and/or a support vector machine model. Based on the features extracted from the feature extractor 936, the display image 920, the parameters 924, the image sensor configuration settings 934, and/or the one or more images 932, the neural network model 940 may provide display device lighting parameters as an output.

For example, based on the one or more images 932, the display image 920, face locations, and optionally one or more image sensor settings and/or a value from an ambient light sensor, the neural network model 940 may provide display device lighting parameters including, but not limited to, a modified display image and/or modified image sensor settings. The modified display image may then be provided to the graphical user interface generator 944 such that the modified display image may be generated. In some examples, the modified display image may refer to a graphical element, such as the graphical element 316 and/or 324; alternatively, or in addition, the modified display image may include a modified user interface that includes the graphical element. In some examples, the modified image sensor settings may adjust one or more image sensor parameters and may be provided to the one or more image sensors 916.

As another example, based on the one or more images 932, the display image 920, and face locations, the neural network model 940 may provide display device lighting parameters including, but not limited to, user interface settings for the communication application 908 and modified image sensor settings. The user interface settings for the communication application 908 may refer to a location, size, etc. of one or more user interface windows, such as the a content window, video conferencing participant window, and/or a local video window (e.g., windows 144A-D, 520A-C, 612, and/or 612 for example). In some examples, the modified image sensor settings may adjust one or more image sensor parameters and may be provided to the one or more image sensors 916.

As another example, based on the one or more images 932, the display image 920, and face locations, and optionally one or more image sensor settings and/or a value from an ambient light sensor, the neural network model 940 may provide display device lighting parameters including, but not limited to, a modified display image, a modified image sensor image, and/or a modified image sensor settings. The modified display image may then be provided to the graphical user interface generator 944 such that the modified display image may be generated. In some examples, the modified display image may refer to a graphical element, such as the graphical element 316 and/or 324; alternatively, or in addition, the modified display image may include a modified user interface that includes the graphical element. In some examples, a modified image sensor image may be provided as output and provided to the communication application 908 instead of an image received from the one or more image sensors 916. In some examples, the modified image sensor settings may adjust one or more image sensor parameters and may be provided to the one or more image sensors 916.

As another example, based on the one or more images 932, the display image 920, and the face locations, the neural network model 940 may provide display device lighting parameters including, but not limited to, a modified image sensor image, a modified image sensor settings, and/or user interface settings for the communication application 908. In some examples, a modified image sensor image may be provided as output and provided to the communication application 908 instead of an image received from the one or more image sensors 916. In some examples, the modified image sensor settings may adjust one or more image sensor parameters and may be provided to the one or more image sensors 916. The user interface settings for the communication application 908 may refer to a location, size, etc. of one or more user interface windows, such as the a content window, video conferencing participant window, and/or a local video window (e.g., windows 144A-D, 520A-C, 612, and/or 612 for example).

In examples, the communication application 908 may transmit the one or more images from the one or more image sensors 916 and/or a modified image sensor image output from the neural network model 940 to a video conference participant. In some examples, the display device lighting parameters may indicate a size, shape, location, and color of a graphical element to be rendered and then displayed at the display device; accordingly, the graphical user interface generator 944 may generate the graphical element based on the display device lighting parameters and provide, as an overlay or as other content, the graphical element to the display device.

In some examples, the one or more images from the one or more image sensors 916 may be processed or otherwise enhanced prior to providing the image to a video conference participant. As an example, an enhancement processing operation may include, but is not limited to a paparazzi enhancement mode, a warm enhancement mode, a blue enhancement mode, and/or a crisp enhancement mode. One or more of the enhancement modes may be performed by an image post-processor 948. The image post-processor 948 may receive the one or more images from the one or more image sensors 916 as image 952 and may also receive user selected parameters 956 (such as, a selection of an enhancement mode to be applied). The image 952 and the user selected parameters 956 may be provided to the neural network model 960. In examples, the neural network model 960 may include but is not limited to a transformer model, a convolutional neural network model, and/or a support vector machine model. The neural network model 960 may output an enhanced image as output; the enhanced image may then be provided a video conferencing participant.

Figure 10:
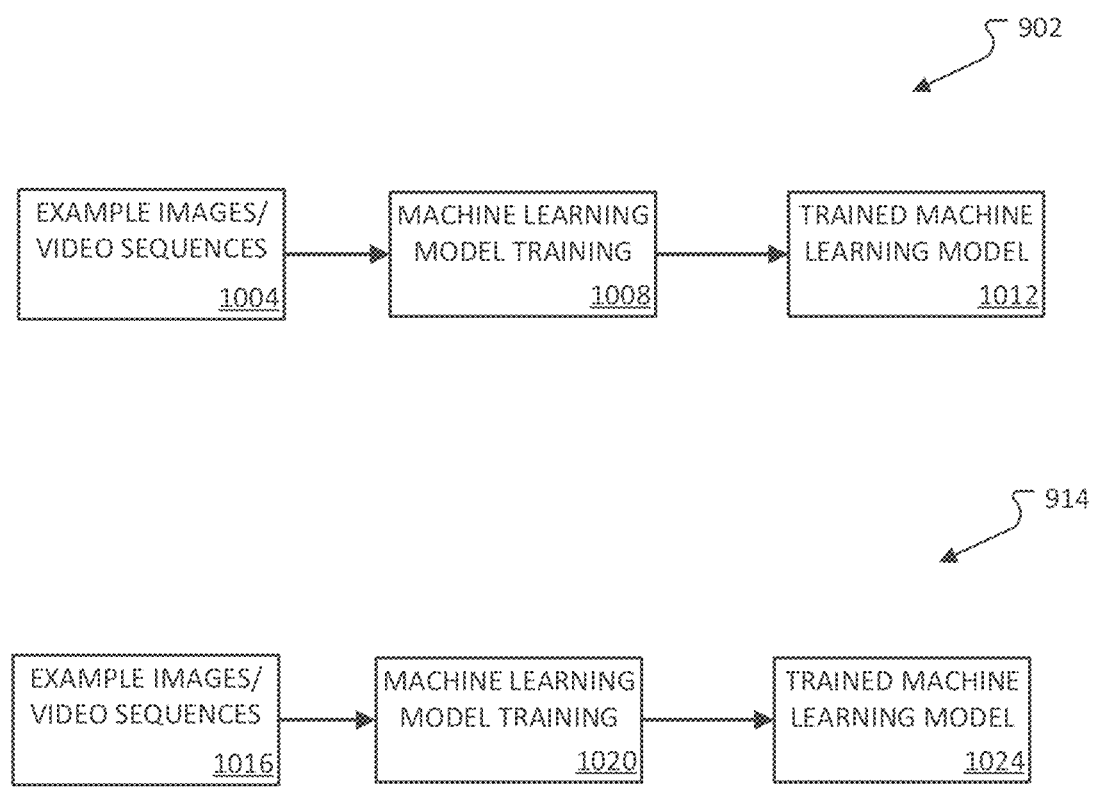
FIG. 10 depicts additional details directed to training a machine learning model in accordance with examples of the present disclosure.

In accordance with examples of the present disclosure, the neural network model 940 may be trained with synthetic training data created with avatars having differing skin characteristics, such as but not limited to absorption, tone, and color that have been subjected to various lighting conditions. Accordingly, as depicted in FIG. 10, the example images/video sequences 1004 may refer to the synthetic training data which may be provided to a machine learning model training process 1008. The machine learning model training process 1008 may derive model parameters and hyperparameters based on the example images/video sequences 1004 and neural network structure. As a result of the training, a trained machine learning model 1012, which may be the same as or similar to the neural network model 940, may be obtained.

As another example, the neural network model 960 may be trained with training data that includes example images/video sequences 1016 that have been subjected to a specific type of enhancement processing. The example images/video sequences 1016 may be provided to a machine learning model training process 1020. The machine learning model training process 1020 may derive model parameters and hyperparameters based on the example images/video sequences 1016 and neural network structure. As a result of the training, a trained machine learning model 1024, which may be the same as or similar to the neural network model 960, may be obtained.

Figure 11:
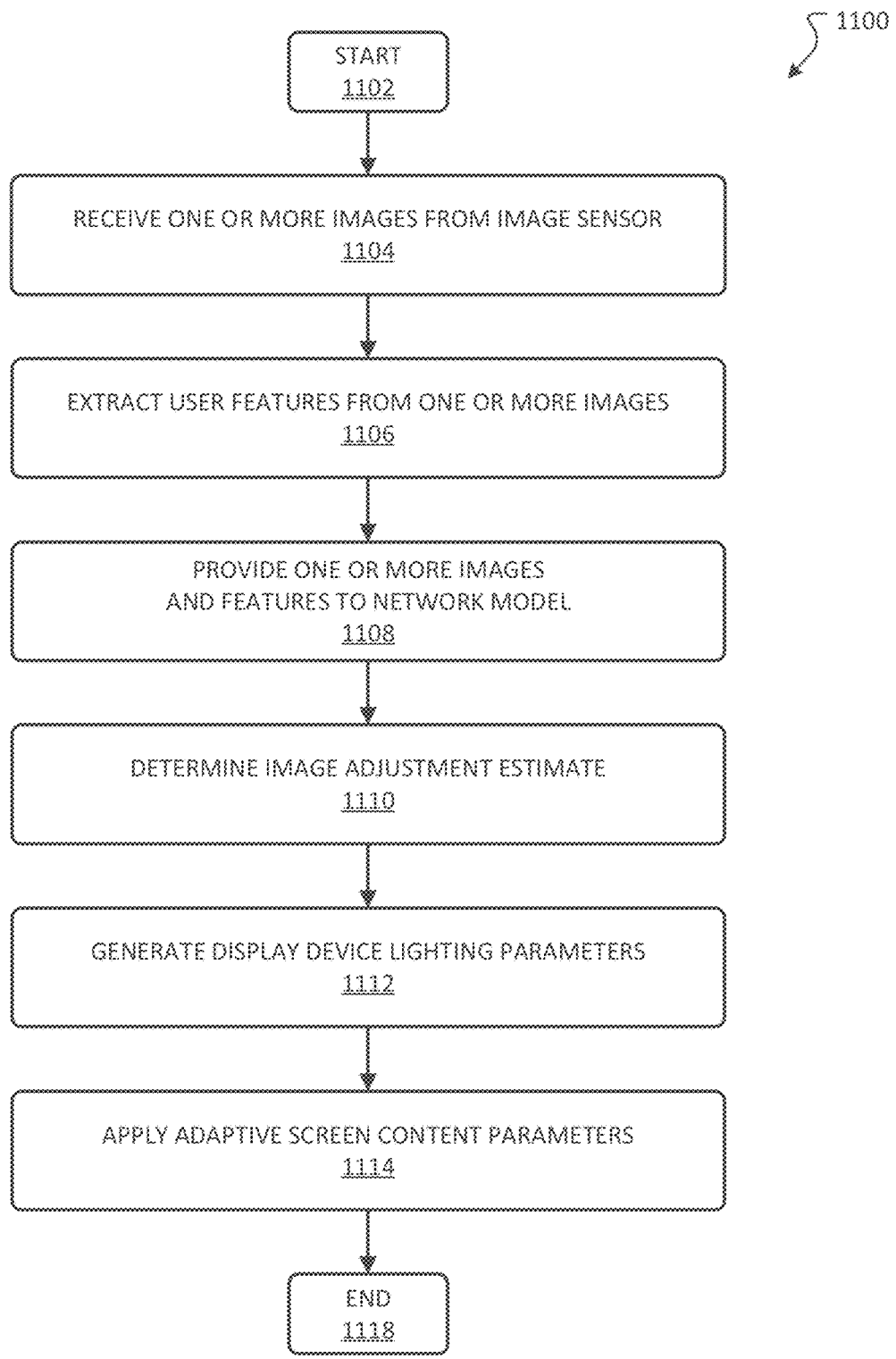
FIG. 11 depicts details of a method for adapting content at a display device in accordance with examples of the present disclosure.

FIG. 11 depicts details of a method 1100 for adapting content rendered and displayed at a display device in accordance with examples of the present disclosure. A general order for the steps of the method 1100 is shown in FIG. 11. Generally, the method 1100 starts at 1102 and ends at 1118. The method 1100 may include more or fewer steps or may arrange the order of the steps differently than those shown in FIG. 11. The method 1100 can be executed as a set of computer-executable instructions executed by a computer system and encoded or stored on a computer readable medium. In examples, aspects of the method 1100 are performed by one or more processing devices, such as a computer or server. Further, the method 1100 can be performed by gates or circuits associated with a processor, Application Specific Integrated Circuit (ASIC), a field programmable gate array (FPGA), a system on chip (SOC), a neural processing unit, or other hardware device. Hereinafter, the method 1100 shall be explained with reference to the systems, components, modules, software, data structures, user interfaces, etc. described in conjunction with FIGS. 1-10.

The method starts at 1102, where flow may proceed to 1104. At 1104, one or more images may be received from an image sensor. The image sensor may be the same as or similar to the image sensor 112 and/or one or more image sensors 916 previously described. The method may proceed to 1106 where the one or more images are processed and image features may be extracted. For example, face locations associated with a user may be extracted from as an image feature. In some examples, a brightness measure of the user's face may be obtained from the image. In another example, an image quality may be extracted as an image feature. The method may proceed to 1108 and one or more images from the one or more image sensors 916 for example together with the one or more extracted features may be provided to a network model, such as the neural network model 940. The neural network model generates an image adjustment estimate at 1110 based on a difference in image quality from the received one or more images and another image, such as a target image. In examples, the image adjustment estimate indicates an amount of blending to be performed between the received one or more images and an adjusted image. Where the extracted features satisfy a desired quality and/or brightness condition, an amount of blending is less than an amount of blending when a measure of a brightness associated with a user's face is less than a satisfactory value.

The neural network model may generate display device lighting parameters at 1112; such parameters may include, but are not limited to, a modified display image, user interface settings for the communication application, modified image sensor settings, and/or a modified image based on the one or more images received from the one or more image sensors 916. The method 1100 may proceed to 1114, where such display device lighting parameters may be applied to a display device, a graphical user interface, an image sensor, and/or an image received from the image sensor. In examples, a modified display image may be provided to the graphical user interface generator 944 such that the modified display image may be generated and displayed at a display device. In some examples, the modified display image may include or otherwise be a graphical element, such as the graphical element 316 and/or 324; alternatively, or in addition, the modified display image may include a modified user interface, such as a content window, that includes the graphical element. Display device lighting parameters may indicate a size, shape, location, and color, hue, and/or tone of the graphical element.

In some examples, the modified image sensor settings may adjust one or more image sensor parameters and may be provided to the one or more image sensors 916. For example, the modified image sensor settings may cause a contrast setting to change. As another example, the modified image sensor settings may cause a white balance setting to change. In some examples, the user interface settings for the communication application may refer to a positioning or location of one or more of the content windows, video participant windows, and/or application windows. For example, and similar to FIGS. 5A-6B, one or more windows may be repositioned and/or moved based on the display device lighting parameters. The method 1100 may end at 1118 and/or flow in a loop back to 1102 for example.

Figure 12:
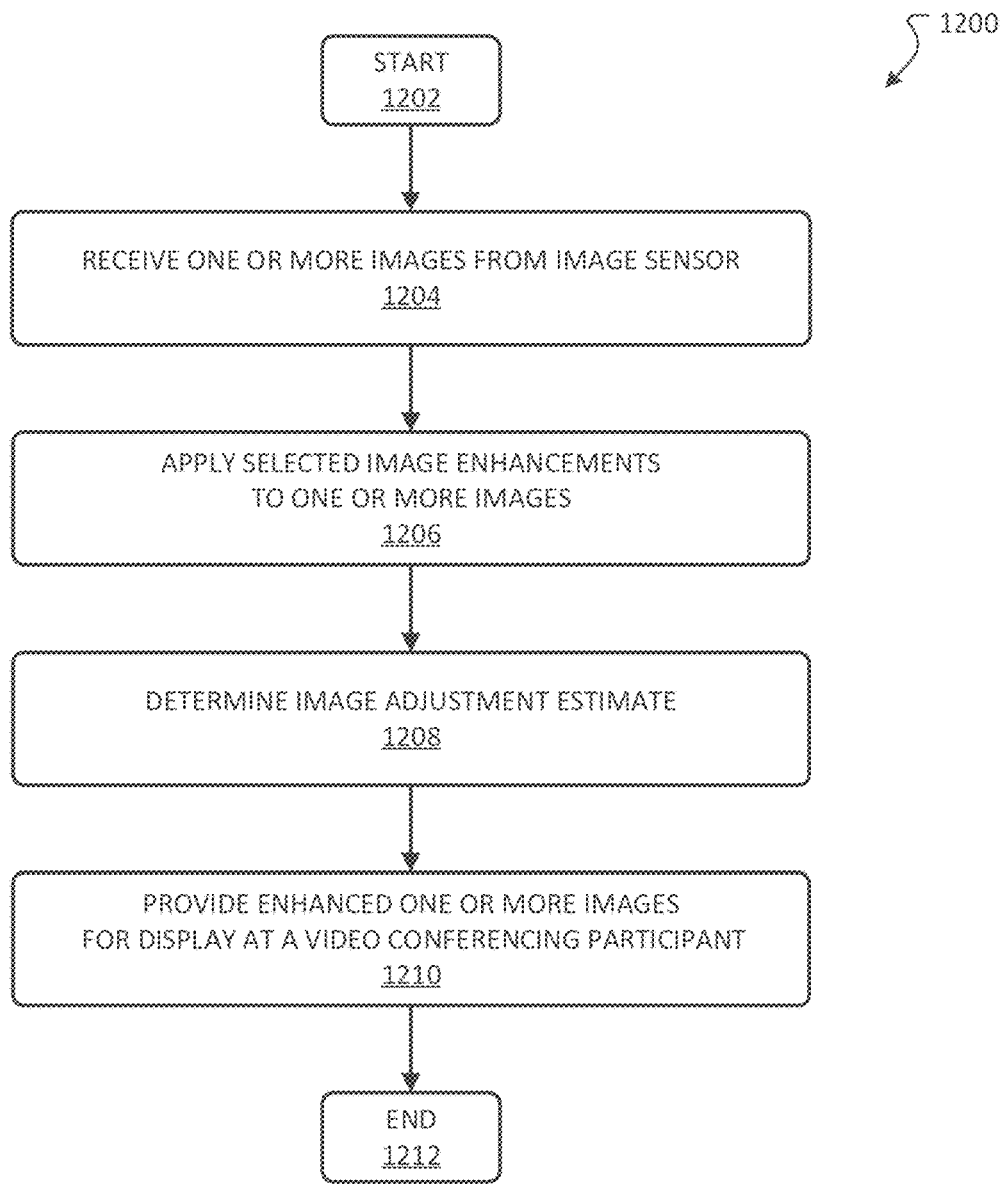
FIG. 12 depicts details of a method for enhancing an image and/or video according to a selected mode of enhancement in accordance with examples of the present disclosure.

FIG. 12 depicts details of a method 1200 for applying an image enhancement function to one or more images acquired by an image sensor of a video conferencing application in accordance with examples of the present disclosure. A general order for the steps of the method 1200 is shown in FIG. 12. Generally, the method 1200 starts at 1202 and ends at 1212. The method 1200 may include more or fewer steps or may arrange the order of the steps differently than those shown in FIG. 12. The method 1200 can be executed as a set of computer-executable instructions executed by a computer system and encoded or stored on a computer readable medium. In examples, aspects of the method 1200 are performed by one or more processing devices, such as a computer or server. Further, the method 1200 can be performed by gates or circuits associated with a processor, Application Specific Integrated Circuit (ASIC), a field programmable gate array (FPGA), a system on chip (SOC), a neural processing unit, or other hardware device. Hereinafter, the method 1200 shall be explained with reference to the systems, components, modules, software, data structures, user interfaces, etc. described in conjunction with FIGS. 1-11.

The method starts at 1202, where flow may proceed to 1204. At 1204, one or more images are received from one or more image sensors. The image sensor may be the same as or similar to the image sensor 112 previously described. The method may proceed to 1206 where a selected image enhancement may be applied to the one or more received images. For example, an enhancement processing operation may include, but is not limited to a paparazzi enhancement mode, a warm enhancement mode, a blue enhancement mode, and/or a crisp enhancement mode. One or more of the enhancement modes may be performed by an image post-processing module, such as the image post-processor 948. That is, an image post-processing module may receive the one or more images from the one or more image sensors at 1204 together with user selected parameters (such as, a selection of an enhancement mode to be applied). The one or more images and the selected parameter may be provided to a neural network model.

In examples, the neural network generates an image adjustment estimate at 1208 based on a difference in image quality from the received one or more images and another image, such as a target image. In examples, the image adjustment estimate may indicate an amount of blending to be performed between the received one or more images and an adjusted image. Where the extracted features satisfy a desired quality and/or a desired image enhancement, an amount of blending is less than an amount of blending when a measure of quality and/or an amount of image enhancement associated with a user's face is less than a satisfactory value. In examples, the neural network model may output an enhanced image as output. At 1210, the enhanced one or more images are provided to a video conferencing participant remotely located from the user. That is, the enhanced image may be provided to one or more conferencing applications at a computing system. The method 1200 may end at 1212. In examples, methods 1100 and 1200 may be performed separately or may be performed substantially in parallel.

Figure 13:
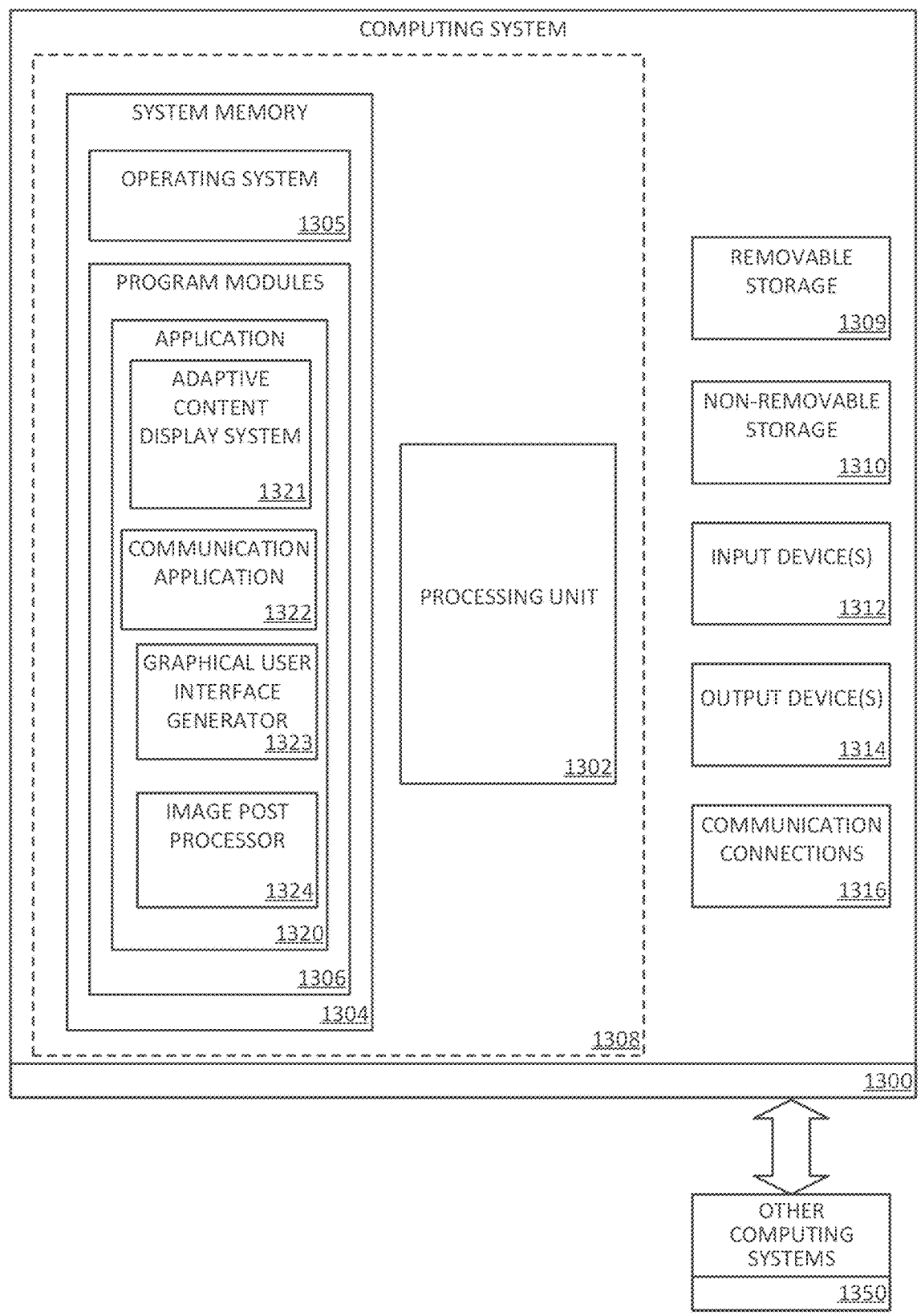
FIG. 13 depicts a block diagram illustrating physical components of a computing system with which aspects of the disclosure may be practiced.
Figure 14A:
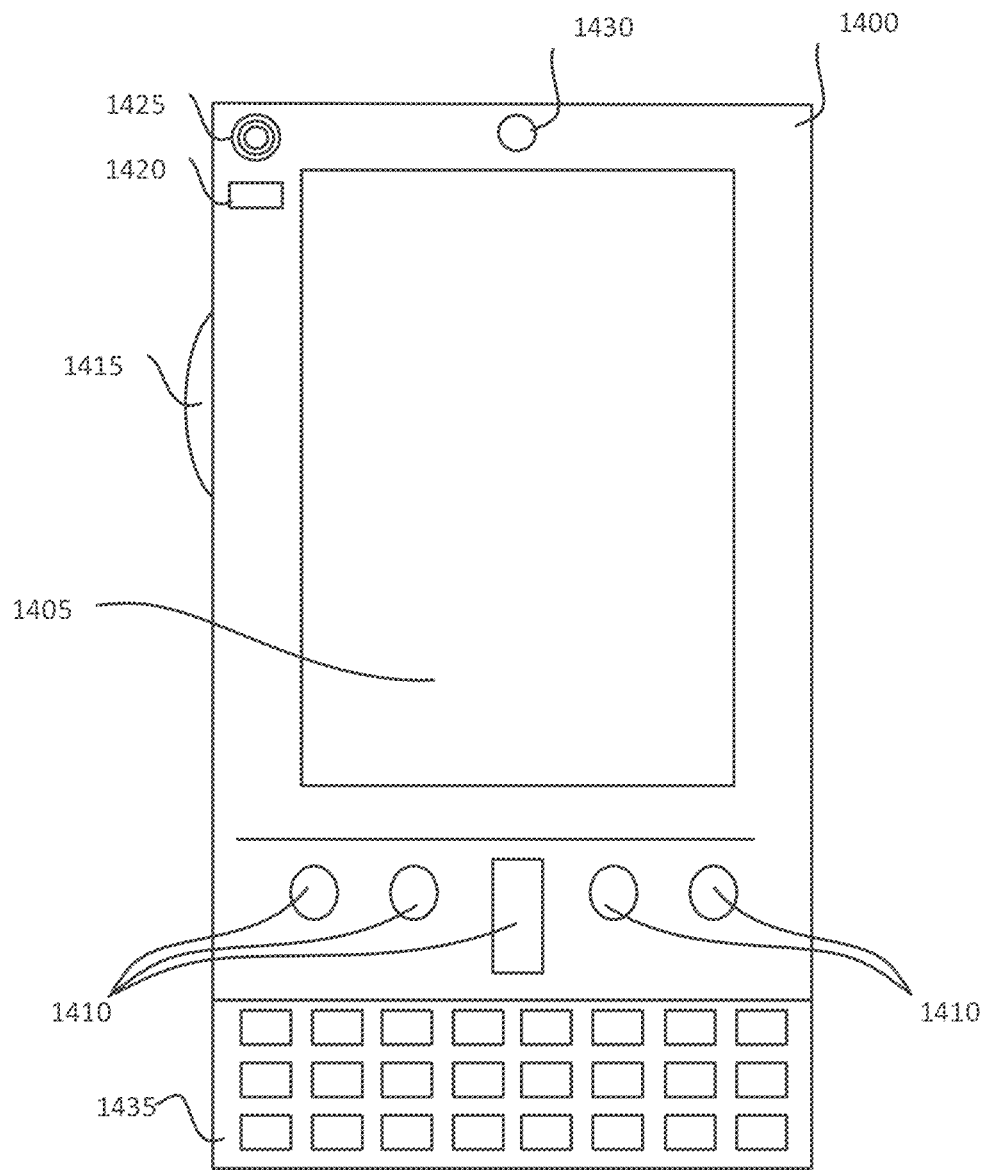
FIGS. 14A-14B depict details of one or more computing systems in accordance with examples of the present disclosure.
Figure 14B:
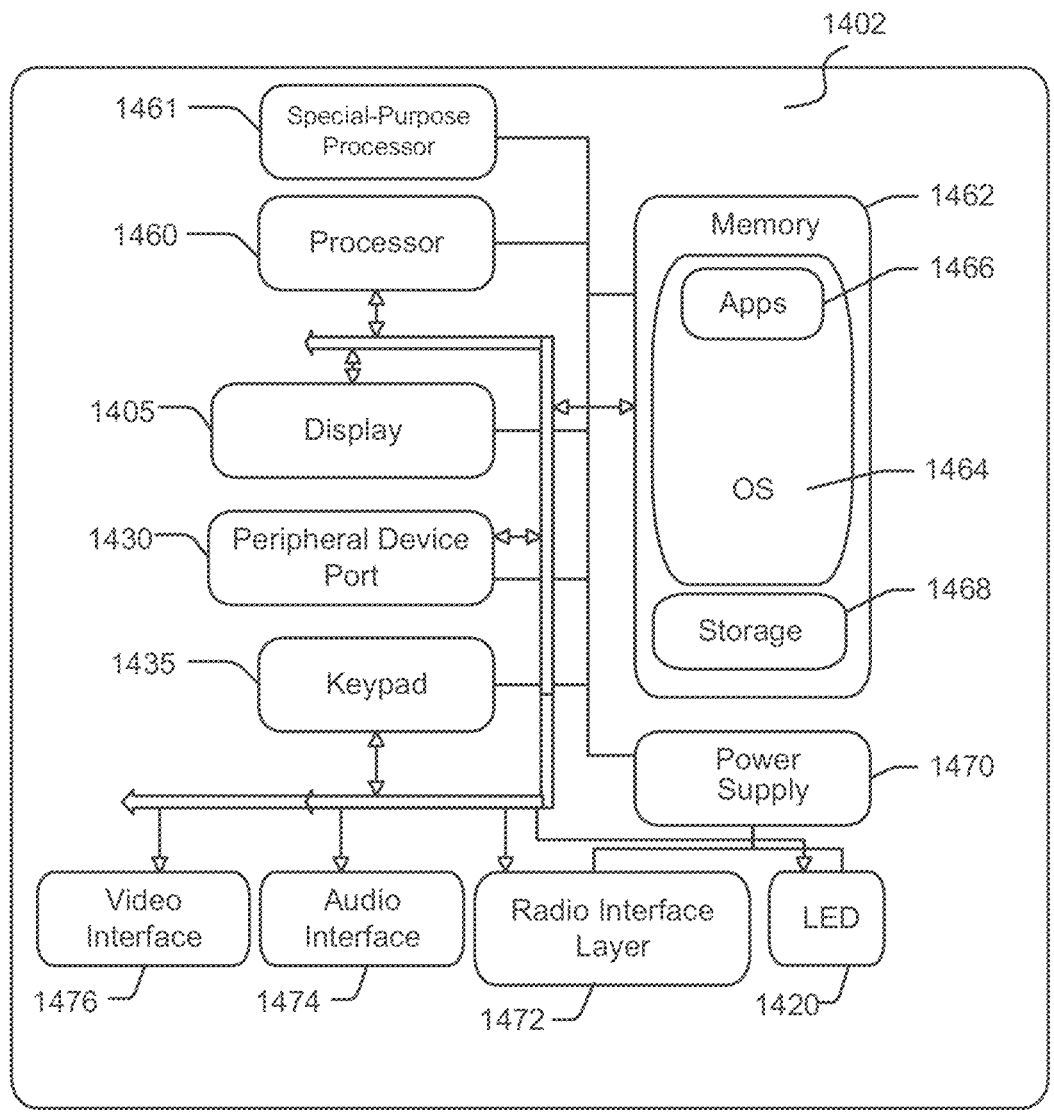
Figure 15:
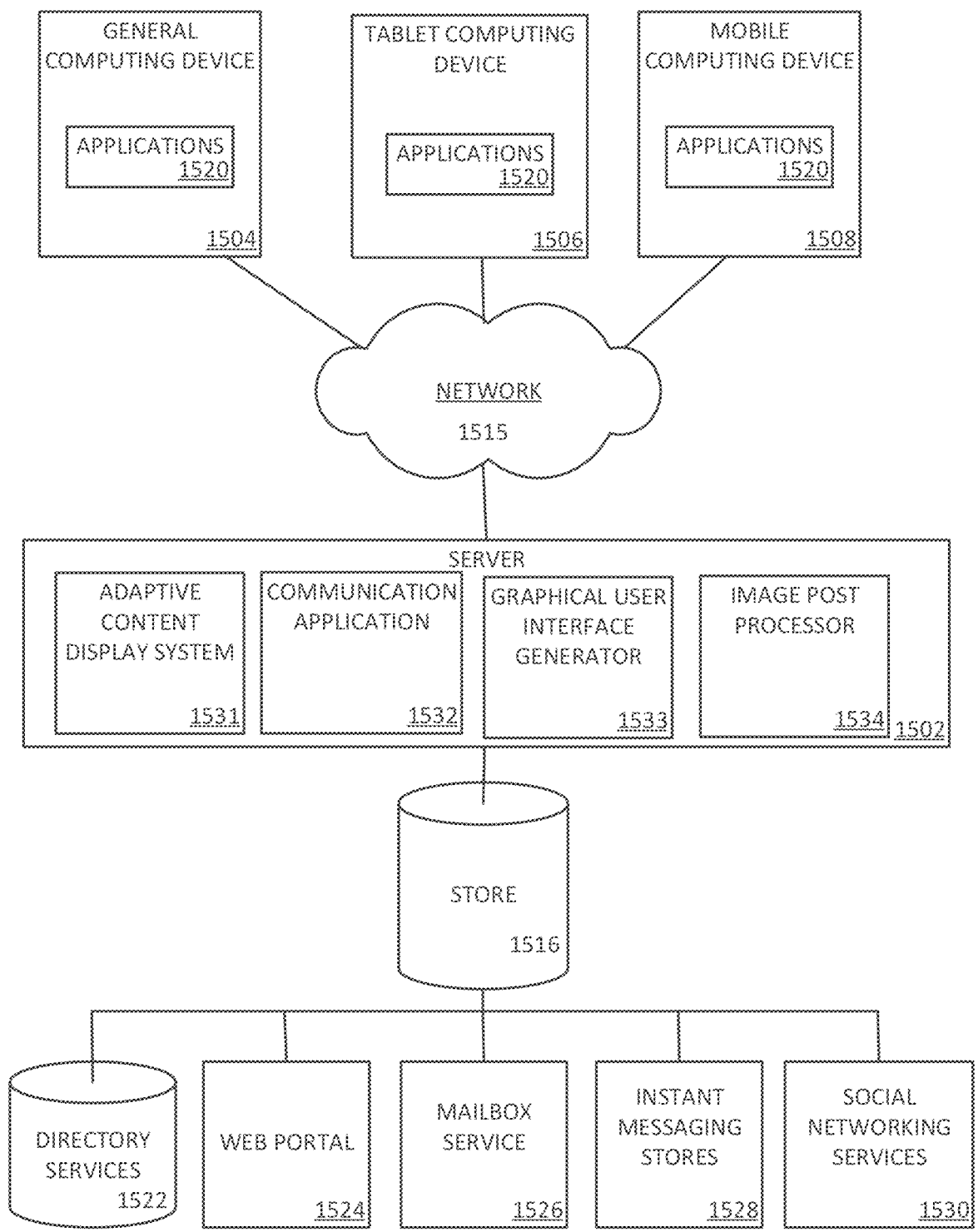
FIG. 15 depicts an architecture of a system for processing data received at a computing system in accordance with examples of the present disclosure.

FIGS. 13-15 and the associated descriptions provide a discussion of a variety of operating environments in which aspects of the disclosure may be practiced. However, the devices and systems illustrated and discussed with respect to FIGS. 13-15 are for purposes of example and illustration and are not limiting of a vast number of computing device configurations that may be utilized for practicing aspects of the disclosure, described herein.

FIG. 13 is a block diagram illustrating physical components (e.g., hardware) of a computing system 1300 with which aspects of the disclosure may be practiced. The computing device components described below may be suitable for the computing and/or processing devices described above. In a basic configuration, the computing system 1300 may include at least one processing unit 1302 and a system memory 1304. Depending on the configuration and type of computing device, the system memory 1304 may comprise, but is not limited to, volatile storage (e.g., random-access memory (RAM)), non-volatile storage (e.g., read-only memory (ROM)), flash memory, or any combination of such memories.

The system memory 1304 may include an operating system 1305 and one or more program modules 1306 suitable for running software application 1320, such as one or more components supported by the systems described herein. As examples, system memory 1304 may include the adaptive content display system 1321, the communication application 1322, the graphical user interface generator 1323, and the image post-processor 1324. The adaptive content display system 1321 may be the same as or similar to the adaptive content display system 138/904 as previously described; the communication application 1322 may be the same as or similar to the communication application 110/908 as previously described; the graphical user interface generator 1323 may be the same as or similar to the graphical user interface generator 944 as previously described; and the image post-processor 1324 may be the same as or similar to the image post-processor 948 as previously described. The operating system 1305, for example, may be suitable for controlling the operation of the computing system 1300.

Furthermore, embodiments of the disclosure may be practiced in conjunction with a graphics library, other operating systems, or any other application program and is not limited to any particular application or system. This basic configuration is illustrated in FIG. 13 by those components within a dashed line 1308. The computing system 1300 may have additional features or functionality. For example, the computing system 1300 may also include additional data storage devices (removable and/or non-removable) such as, for example, magnetic disks, optical disks, or tape. Such additional storage is illustrated in FIG. 13 by a removable storage device 1309 and a non-removable storage device 1310.

As stated above, a number of program modules and data files may be stored in the system memory 1304. While executing on the processing unit 1302, the program modules 1306 (e.g., software applications 1320) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided programs, etc.

Furthermore, embodiments of the disclosure may be practiced in an electrical circuit discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 11 may be integrated onto a single integrated circuit. Such an SOC device may include one or more processing units, graphics units, communications units, system virtualization units and various application functionality, all of which are integrated (or "burned") onto the chip substrate as a single integrated circuit. When operating via an SOC, the functionality, described herein, with respect to the capability of client to switch protocols may be operated via application-specific logic integrated with other components of the computing system 1300 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

The computing system 1300 may also have one or more input device(s) 1312 such as a keyboard, a mouse, a pen, a sound or voice input device, a touch or swipe input device, etc. The one or more input device 1312 may include an image sensor, such as one or more image sensors 112. The output device(s) 1314 such as a display, speakers, a printer, etc. may also be included. The aforementioned devices are examples and others may be used. The computing system 1300 may include one or more communication connections 1316 allowing communications with other computing devices/systems 1350. Examples of suitable communication connections 1316 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable, and non-removable media implemented in any method or technology for storage of information, such as computer readable instructions, data structures, or program modules. The system memory 1304, the removable storage device 1309, and the non-removable storage device 1310 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing system 1300. Any such computer storage media may be part of the computing system 1300. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 14A-14B illustrate a mobile computing device 1400, for example, a mobile telephone, a smart phone, wearable computer (such as a smart watch), a tablet computer, a laptop computer, and the like, with which embodiments of the disclosure may be practiced. In some respects, the client may be a mobile computing device. With reference to FIG. 14A, one aspect of a mobile computing device 1400 for implementing the aspects is illustrated. In a basic configuration, the mobile computing device 1400 is a handheld computer having both input elements and output elements. The mobile computing device 1400 typically includes a display 1405 and one or more input buttons 1410 that allow the user to enter information into the mobile computing device 1400. The display 1405 of the mobile computing device 1400 may also function as an input device (e.g., a touch screen display).

If included, an optional side input element 1415 allows further user input. The side input element 1415 may be a rotary switch, a button, or any other type of manual input element. In alternative aspects, mobile computing device 1400 may incorporate greater or fewer input elements. For example, the display 1405 may not be a touch screen in some embodiments.

In yet another alternative embodiment, the mobile computing device 1400 is a portable phone system, such as a cellular phone. The mobile computing device 1400 may also include an optional keypad 1435. Optional keypad 1435 may be a physical keypad or a "soft" keypad generated on the touch screen display.

In various embodiments, the output elements include the display 1405 for showing a graphical user interface (GUI), a visual indicator 1420 (e.g., a light emitting diode), and/or an audio transducer 1425 (e.g., a speaker). In some aspects, the mobile computing device 1400 incorporates a vibration transducer for providing the user with tactile feedback. In yet another aspect, the mobile computing device 1400 incorporates input and/or output ports, such as an audio input (e.g., a microphone jack), an audio output (e.g., a headphone jack), and a video output (e.g., a HDMI port) for sending signals to or receiving signals from an external device.

FIG. 14B is a block diagram illustrating the architecture of one aspect of a mobile computing device. That is, the mobile computing device 1400 can incorporate a system (e.g., an architecture) 1402 to implement some aspects. In one embodiment, the system 1402 is implemented as a "smart phone" capable of running one or more applications (e.g., browser, e-mail, calendaring, contact managers, messaging clients, games, and media clients/players). In some aspects, the system 1402 is integrated as a computing device, such as an integrated personal digital assistant (PDA) and wireless phone.

One or more application programs 1466 may be loaded into the memory 1462 and run on or in association with the operating system 1464. Examples of the application programs include phone dialer programs, e-mail programs, personal information management (PIM) programs, word processing programs, spreadsheet programs, Internet browser programs, messaging programs, maps programs, and so forth. The system 1402 also includes a non-volatile storage area 1468 within the memory 1462. The non-volatile storage area 1468 may be used to store persistent information that should not be lost if the system 1402 is powered down. The application programs 1466 may use and store information in the non-volatile storage area 1468, such as e-mail or other messages used by an e-mail application, and the like. A synchronization application (not shown) also resides on the system 1402 and is programmed to interact with a corresponding synchronization application resident on a host computer to keep the information stored in the non-volatile storage area 1468 synchronized with corresponding information stored at the host computer. As should be appreciated, other applications may be loaded into the memory 1462 and run on the mobile computing device 1400 described herein (e.g., search engine, extractor module, relevancy ranking module, answer scoring module, etc.).

The system 1402 has a power supply 1470, which may be implemented as one or more batteries. The power supply 1470 might further include an external power source, such as an AC adapter or a powered docking cradle that supplements or recharges the batteries.

The system 1402 may also include a radio interface layer 1472 that performs the function of transmitting and receiving radio frequency communications. The radio interface layer 1472 facilitates wireless connectivity between the system 1402 and the "outside world," via a communications carrier or service provider. Transmissions to and from the radio interface layer 1472 are conducted under control of the operating system 1464. In other words, communications received by the radio interface layer 1472 may be disseminated to the application programs 1466 via the operating system 1464, and vice versa.

The visual indicator 1420 may be used to provide visual notifications, and/or an audio interface 1474 may be used for producing audible notifications via the audio transducer 1425. In the illustrated embodiment, the visual indicator 1420 is a light emitting diode (LED) and the audio transducer 1425 is a speaker. These devices may be directly coupled to the power supply 1470 so that when activated, they remain on for a duration dictated by the notification mechanism even though the processor 1460 and other components might shut down for conserving battery power. The LED may be programmed to remain on indefinitely until the user takes action to indicate the powered-on status of the device. The audio interface 1474 is used to provide audible signals to and receive audible signals from the user. For example, in addition to being coupled to the audio transducer 1425, the audio interface 1474 may also be coupled to a microphone to receive audible input, such as to facilitate a telephone conversation. In accordance with embodiments of the present disclosure, the microphone may also serve as an audio sensor to facilitate control of notifications, as will be described below. The system 1402 may further include a video interface 1476 that enables an operation of an on-board camera 1430 to record still images, video stream, and the like. The onboard camera may be the same as or similar to the previously described image sensor 112.

A mobile computing device 1400 implementing the system 1402 may have additional features or functionality. For example, the mobile computing device 1400 may also include additional data storage devices (removable and/or non-removable) such as, magnetic disks, optical disks, or tape. Such additional storage is illustrated in FIG. 14B by the non-volatile storage area 3068.

Data/information generated or captured by the mobile computing device 1400 and stored via the system 1402 may be stored locally on the mobile computing device 1400, as described above, or the data may be stored on any number of storage media that may be accessed by the device via the radio interface layer 1472 or via a wired connection between the mobile computing device 1400 and a separate computing device associated with the mobile computing device 1400, for example, a server computer in a distributed computing network, such as the Internet. As should be appreciated such data/information may be accessed via the mobile computing device 1400 via the radio interface layer 1472 or via a distributed computing network. Similarly, such data/information may be readily transferred between computing devices for storage and use according to well-known data/information transfer and storage means, including electronic mail and collaborative data/information sharing systems.

FIG. 15 illustrates one aspect of the architecture of a system for processing data received at a computing system from a remote source, such as a personal computer 1504, tablet computing device 1506, or mobile computing device 1508, as described above. The personal computer 1504, tablet computing device 1506, or mobile computing device 1508 may include one or more applications 1520; such applications may include but is not limited to the adaptive content display system, the communication application, the graphical user interface generator, and the image post-processor as previously described. Content at a server device 1502 may be stored in different communication channels or other storage types. For example, various documents may be stored using a directory service 1522, a web portal 1524, a mailbox service 1526, an instant messaging store 1528, or social networking services 1530.

One or more of the previously described program modules 1306 or software applications 1320 may be employed by server device 1502 and/or the personal computer 1504, tablet computing device 1506, or mobile computing device 1508, as described above. For example, the server device 1502 may include the adaptive content display system 1531, the communication application 1532, the graphical user interface generator 1533, and the image post-processor 1534. The adaptive content display system 1531 may be the same as or similar to the adaptive content display system 138/904 as previously described; the communication application 1532 may be the same as or similar to the communication application 110/908 as previously described; the graphical user interface generator 1533 may be the same as or similar to the graphical user interface generator 944 as previously described; and the image post-processor 1534 may be the same as or similar to the image post-processor 948 as previously described.

The server device 1502 may provide data to and from a client computing device such as a personal computer 1504, a tablet computing device 1506 and/or a mobile computing device 1508 (e.g., a smart phone) through a network 1515. By way of example, the computer system described above may be embodied in a personal computer 1504, a tablet computing device 1506 and/or a mobile computing device 1508 (e.g., a smart phone). Any of these embodiments of the computing devices may obtain content from the store 1516, in addition to receiving graphical data useable to be either pre-processed at a graphic-originating system, or post-processed at a receiving computing system.

In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

The present disclosure relates to systems and methods for adjusting an illumination of a user according to at least the examples provided in the sections below:

(A1) In one aspect, some embodiments include a method for adjusting an illumination of a user depicted in one or more images. The method may be performed at a computing device in communication with a network. The method includes: receiving one or more images from an image sensor; extracting a plurality of image features from the received one or more images; determining that an illumination of a user depicted in the one or more images is unsatisfactory based on the extracted features and the received one or more images; identifying content displayed at a display device; and adapting the identified content displayed at the display device based on the extracted features and the received one or more images, the adapted content changing an illumination of the user.

(A2) In some embodiments of A1, adapting the content displayed at the display device includes: generating a graphical element to render at the display device based on the extracted image features and the received one or more images; and causing the graphical element to be rendered at the display device, the graphical element changing an illumination of the user.

(A3) In some embodiments of A1-A2, at least one extracted image feature of the plurality of image features is a location associated with a face of the user, and the adapted content displayed at the display device is displayed at the display device such that the adapted content illuminates the face of the user.

(A4) In some embodiments of A1-A3, the method further includes changing at least one of a position of the graphical element, a size of the graphical element, and a color of the graphical element.

(A5) In some embodiments of A1-A4, the graphical element is at least one of a light ring, light square, and light bar.

(A6) In some embodiments of A1-A5, adapting the content displayed at the display device includes: receiving an image identifying content displayed at the display device; rearranging the identified content; and causing the rearranged content to be rendered at the display device, the rearranged content changing an illumination of the user.

(A7) In some embodiments of A1-A6, rearranging the identified content includes: identifying one or more application windows displayed at the display device; and moving at least one application of the one or more application windows from a first position to a second position.

(A8) In some embodiments of A1-A7, the method further includes generating a graphical element to render at the display device based on the extracted image features and the received one or more images; and causing the graphical element to be rendered at the display device, the graphical element changing an illumination of the user.

(A9) In some embodiments of A1-A8, the method further includes changing at least one configuration setting associated with the image sensor based on the determining that the illumination of the user depicted in the one or more images is unsatisfactory.

(A10) In some embodiments of A1-A9, the method further includes providing the extracted image features, an image of content currently displayed at the display device, and the received one or more images to a neural network model; and generating, by the neural network model, the updated received image content.

(A11) In some embodiments of A1-10, the method further includes providing the extracted image features, and the image of content currently displayed, and the received one or more images to a neural network model; and generating, by the neural network model, the adapted content and the updated received image content.

(A12) In some embodiments of A1-A11, the method further includes providing the extracted image features and the received one or more images to a neural network model; and generating, by the neural network model, the adapted content.

In yet another aspect, some embodiments include a computing system including one or more processors and memory coupled to the one or more processors, the memory storing one or more programs configured to be executed by the one or more processors, the one or more programs including instructions for performing any of the methods described herein (e.g., A1-A12 described above).

In yet another aspect, some embodiments include a non-transitory computer-readable storage medium storing one or more programs for execution by one or more processors of a storage device, the one or more programs including instructions for performing any of the methods described herein (e.g., A1-A12 described above).

The present disclosure relates to systems and methods for adjusting an illumination of a user depicted in one or more images according to at least the examples provided in the sections below:

(B1) In one aspect, some embodiments include a method of adjusting an illumination of a user depicted in one or more images. The method is performed at a computing device in communication with a network. The method includes: receiving, at a video conferencing application, one or more images from an image sensor; extracting a plurality of image features from the received one or more images; determining that an illumination of a user depicted in the one or more images is unsatisfactory based on the extracted features and the received one or more images; receiving an image of content displayed at a display device; and generating display device lighting parameters based on the extracted features, the received one or more images, and the image of content displayed at the display device, wherein the display device lighting parameters cause a change in the illumination of the user depicted in images subsequently received from the image sensor.

(B2) In some embodiments of B 1, the method further includes moving at least one user interface element rendered to the display device based on the display device lighting parameters.

(B3) In some embodiments of B1-B2, the method further includes changing at least one configuration parameter of the image sensor.

(B4) In some embodiments of B1-B3, the method further includes generating a graphical element to render at the display device based on the display device lighting parameters; and causing the graphical element to be rendered at the display device, the graphical element changing an illumination of the user.

In yet another aspect, some embodiments include a computing system including one or more processors and memory coupled to the one or more processors, the memory storing one or more programs configured to be executed by the one or more processors, the one or more programs including instructions for performing any of the methods described herein (e.g., B1-B4 described above).

In yet another aspect, some embodiments include a non-transitory computer-readable storage medium storing one or more programs for execution by one or more processors of a storage device, the one or more programs including instructions for performing any of the methods described herein (e.g., B1-B4 described above).

The present disclosure relates to systems and methods for adjusting an illumination of a user depicted in one or more images according to at least the examples provided in the sections below:

(C1) In one aspect, some embodiments include a method of adjusting an illumination of a user depicted in one or more images. The method is performed at a computing device in communication with a network. The method includes: receiving one or more images from an image sensor; determining that an illumination of a user depicted in the one or more images is unsatisfactory; identifying content displayed at a display device; modifying the identified content displayed at the display device based on the determination that the illumination of the user depicted in the one or more images is unsatisfactory; and causing the modified content to be rendered to the display device.

(C2) In some embodiments of C1, the method further includes generating a graphical element to render at the display device; and causing the graphical element to be rendered at the display device, the graphical element changing an illumination of the user.

(C3) In some embodiments of C1-C2, the method further includes changing an illumination of the user depicted in the one or more images such that a brightness associated with a portion of the user depicted in the one or more images is reduced.

(C4) In some embodiments of C1-C3, the method further includes receiving user input; and determining that the illumination of the user depicted in the one or more images is unsatisfactory based on the received user input.

In yet another aspect, some embodiments include a computing system including one or more processors and memory coupled to the one or more processors, the memory storing one or more programs configured to be executed by the one or more processors, the one or more programs including instructions for performing any of the methods described herein (e.g., C1-C4 described above).

In yet another aspect, some embodiments include a non-transitory computer-readable storage medium storing one or more programs for execution by one or more processors of a storage device, the one or more programs including instructions for performing any of the methods described herein (e.g., C1-C4 described above).

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method for adjusting an illumination of a user depicted in one or more images, the method comprising:
    receiving one or more images from an image sensor;
    extracting a plurality of image features from the received one or more images;
    determining that an illumination of a user depicted in the one or more images is unsatisfactory based on the extracted features;
    identifying content displayed at a display device;
    determining, based on the extracted features and the received one or more images, one or more lighting parameters, wherein the one or more lighting parameters comprise:
        enhancement settings parameter of the received one or more images for transmission over a network,
        image sensor settings parameter for capturing the user, and
        illumination settings parameter for the identified content;
    adapting enhancement on the received one or more images based on the enhancement settings parameter;
    adapting the settings of the image sensor based on the image sensor settings parameter; and
    adapting, based on the illumination setting parameter for the identified content, the identified content displayed at the display device, the adapted content changing an illumination of the user.

2. The method of claim 1, wherein adapting the content displayed at the display device includes:
    generating a graphical element to render at the display device based on the extracted image features and the received one or more images; and
    causing the graphical element to be rendered at the display device, the graphical element changing an illumination of the user.

3. The method of claim 2, wherein at least one extracted image feature of the plurality of image features is a location associated with a face of the user, and wherein the adapted content displayed at the display device is displayed at the display device such that the adapted content illuminates the face of the user.

4. The method of claim 2, further comprising:
    changing at least one of a position of the graphical element, a size of the graphical element, and a color of the graphical element.

5. The method of claim 2, wherein the graphical element is at least one of a light ring, light square, and light bar.

6. The method of claim 1, wherein adapting the content displayed at the display device includes:
    receiving an image identifying content displayed at the display device;
    rearranging the identified content; and
    causing the rearranged content to be rendered at the display device, the rearranged content changing an illumination of the user.

7. The method of claim 5, wherein rearranging the identified content includes:
    identifying one or more application windows displayed at the display device; and
    moving at least one application of the one or more application windows from a first position to a second position.

8. The method of claim 7, further comprising:
    generating a graphical element to render at the display device based on the extracted image features and the received one or more images; and
    causing the graphical element to be rendered at the display device, the graphical element changing an illumination of the user.

9. The method of claim 1, further comprising changing at least one configuration setting associated with the image sensor based on the determining that the illumination of the user depicted in the one or more images is unsatisfactory.

10. The method of claim 1, further comprising:
    providing the extracted image features, an image of content currently displayed at the display device, and the received one or more images to a neural network model; and
    generating, by the neural network model, the updated received image content.

11. The method of claim 1, further comprising:
    providing the extracted image features, and the image of content currently displayed, and the received one or more images to a neural network model; and
    generating, by the neural network model, the adapted content and the updated received image content.

12. The method of claim 1, further comprising:
    providing the extracted image features and the received one or more images to a neural network model; and generating, by the neural network model, the adapted content.

13. A system for adjusting an illumination of a user depicted in one or more images, the system comprising:
   a processor;
   an image sensor; and
   memory including instructions, which when executed by the processor, cause the processor to:
      receive, at a video conferencing application, one or more images from an image sensor;
      extract a plurality of image features from the received one or more images;
      determine that an illumination of a user depicted in the one or more images is unsatisfactory based on the extracted features;
      receive an image of content displayed at a display device;
      generate, based on the extracted features and the received one or more images, one or more lighting parameters, wherein the one or more display device lighting parameters comprise:
         enhancement settings parameter of the received one or more images for transmission over a network,
         image sensor settings parameter for capturing the user, and
         illumination settings parameter for the identified content;
      adapt enhancement on the received one or more images based on the enhancement settings parameter;
      adapt the settings of the image sensor based on the image sensor settings parameter; and
      cause a change in the illumination of the user depicted in images subsequently received from the image sensor.

14. The system of claim 13, wherein the instructions, when executed by the processor, cause the processor to:
   move at least one user interface element rendered to the display device based on the display device lighting parameters.

15. The system of claim 13, wherein the instructions, when executed by the processor, cause the processor to:
   change at least one configuration parameter of the image sensor.

16. The system of claim 13, wherein the instructions, when executed by the processor, cause the processor to:
   generate a graphical element to render at the display device based on the display device lighting parameters; and
   cause the graphical element to be rendered at the display device, the graphical element changing an illumination of the user.

17. A device comprising a processor configured to execute a method comprising:
   receiving one or more images from an image sensor;
   determining that an illumination of a user depicted in the one or more images is unsatisfactory;
   identifying content displayed at a display device;
   determining, based on the received one or more images, one or more lighting parameters, wherein the one or more lighting parameters comprise:
      enhancement settings parameter of the received one or more images for transmission over a network,
      image sensor settings parameter for capturing the user, and
      illumination settings parameter for the identified content;
   adapting enhancement on the received one or more images based on the enhancement settings parameter;
   adapting the settings of the image sensor based on the image sensor settings parameter;
   modifying the identified content displayed at the display device based on the determination that the illumination of the user depicted in the one or more images is unsatisfactory; and
   causing the modified content to be rendered to the display device.

18. The device of claim 17, wherein the instructions, which when executed by a processor, the processor to:
   generating a graphical element to render at the display device; and
   causing the graphical element to be rendered at the display device, the graphical element changing an illumination of the user.

19. The device of claim 17, wherein the instructions, which when executed by a processor, the processor to:
   changing an illumination of the user depicted in the one or more images such that a brightness associated with a portion of the user depicted in the one or more images is reduced.

20. The device of claim 17, wherein the instructions, which when executed by a processor, the processor to:
   receiving user input; and
   determining that the illumination of the user depicted in the one or more images is unsatisfactory based on the received user input.

* * * * *